US012267504B2

(12) United States Patent
Gudumasu et al.

(10) Patent No.: US 12,267,504 B2
(45) Date of Patent: Apr. 1, 2025

(54) ADAPTIVE STREAMING OF GEOMETRY-BASED POINT CLOUDS

(71) Applicant: InterDigital Patent Holdings, Inc., Wilmington, DE (US)

(72) Inventors: Srinivas Gudumasu, Montreal (CA); Ahmed Hamza, Coquitlam (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 78 days.

(21) Appl. No.: 18/011,029

(22) PCT Filed: Jun. 22, 2021

(86) PCT No.: PCT/US2021/038334
§ 371 (c)(1),
(2) Date: Dec. 16, 2022

(87) PCT Pub. No.: WO2021/262623
PCT Pub. Date: Dec. 30, 2021

(65) Prior Publication Data
US 2023/0276053 A1    Aug. 31, 2023

Related U.S. Application Data

(60) Provisional application No. 63/084,758, filed on Sep. 29, 2020, provisional application No. 63/042,481, filed on Jun. 22, 2020.

(51) Int. Cl.
*H04N 19/597* (2014.01)
*H04N 19/134* (2014.01)
(Continued)

(52) U.S. Cl.
CPC ......... *H04N 19/134* (2014.11); *H04N 19/174* (2014.11); *H04N 19/597* (2014.11); *H04N 19/70* (2014.11)

(58) Field of Classification Search
CPC .. H04N 19/134; H04N 19/174; H04N 19/597; H04N 19/70
(Continued)

(56) References Cited

U.S. PATENT DOCUMENTS 11,394,979 B2 *    7/2022  Oh ................. H04N 21/440245
2022/0038517 A1*   2/2022  Takahashi ............... H04L 65/65
(Continued)

OTHER PUBLICATIONS

Gudumasu et al., "DASH Signaling of G-PCC Tiles", InterDigital, Inc., ISO/IEC JTC1/SC29/WG3 m54952, Electronic Meeting, Oct. 2020, 8 pages.
(Continued)

*Primary Examiner* — Albert Kir
(74) *Attorney, Agent, or Firm* — Condo Roccia Koptiw LLP

(57) ABSTRACT

Systems, methods, and instrumentalities are disclosed for receiving content related to geometry-based point clouds. A client device may receive a media presentation description (MPD) file from a content server, A set of pre-selection elements may be identified from the MPD file. One or more adaptation sets associated with at least one pre-selection element of the set of pre-selection elements may be identified. The adaptation set(s) may be indicated by an attribute associated with one of the pre-selection elements. A geometry-based point cloud compression (GPCC) tile identifier associated with a viewport may be determined. The GPCC tile identifier may be determined based on a first descriptor received in the MPD file. One or more adaptation sets associated with the GPCC tile identifier may be selected using a second descriptor. A point cloud component associated with the selected one or more adaptation sets may be requested. Point cloud component may be received.

20 Claims, 13 Drawing Sheets

(51) Int. Cl.
*H04N 19/174* (2014.01)
*H04N 19/70* (2014.01)

(58) Field of Classification Search
USPC ..................................................... 375/240.02
See application file for complete search history.

(56) References Cited

U.S. PATENT DOCUMENTS

2022/0366611 A1* 11/2022 Bai .................. H04N 21/85406
2023/0048474 A1* 2/2023 Hu ........................... G06T 17/20
2024/0054682 A1* 2/2024 Bai ...................... H04N 21/816

OTHER PUBLICATIONS

Hamza et al., "[VPCC] DASH Signaling for V-PCC", InterDigital Communications, Inc., ISO/IEC JTC1/SC29/WG11 m47436, Geneva, Switzerland, Mar. 2019, 7 pages.

Hamza et al., "On DASH Signaling or V-PCC", InterDigital Communications, Inc., ISO/IEC JTC1/SC29/WG11 m49110, Gothenburg, SE, Jul. 2019, 6 pages.

ISO/IEC, "G-PCC Future Enhancements", MPEG 130, N19328, 3DG, ISO/IEC JTC 1/SC 29/WG 11 Coding of moving pictures and audio Convenorship: UNI (Italy), Apr. 2020, 6 pages.

ISO/IEC, "Information Technology—Coding of Audio-Visual Objects—Part 12: ISO Base Media File Format", ISO/IEC 14496-12:2015(E), Dec. 15, 2015, 248 pages.

ISO/IEC, "Technologies Under Consideration for Carriage of V3C Data", Systems, N19260, Approved WG 11 Document, ISO/IEC JTC 1/SC 29/WG 11, Coding of Moving Pictures and Audio, May 25, 2020, 78 pages.

Tulvan et al., "Use Cases for Point Cloud Compression (PCC)", ISO/IEC JTC1/SC29/WG11 MPEG2015/ N16331; Geneva, CH, Jun. 2016, 8 pages.

ISO/IEC, "Information technology—MPEG-I (Coded Representation of Immersive Media)—Part 9: Geometry-based Point Cloud Compression", ISO/IEC 23090-9:2020(E) ISO/IEC JTC 1/SC 29/WG 11, 2020, 127 pages.

ISO/IEC, "Information technology—MPEG-I (Coded Representation of Immersive Media)—Part 9: Geometry-based Point Cloud Compression", N19328, MPEG 131, ISO/IEC 23090-9:2020(E) ISO/IEC JTC 1/SC 29/WG 11, Jul. 2020, 141 pages.

ISO/IEC, "Revised text of ISO/IEC FDIS 23009-1 3rd edition", N18312, Editors, International Organisation for Standardisation Organisation Internationale De Normalisation, ISO/IEC JTC1/SC29/WG11, Coding of Moving Pictures And Audio, MPEG 125, Marrakech, Morocco, Jan. 2019, 1 page.

ISO/IEC, "WD of ISO/IEC 23090-18 Carriage of Geometry-based Point Cloud Compression Data", N19286, MPEG 130, Systems, ISO/IEC JTC 1/SC 29/WG 11 Coding of moving pictures and audio Convenorship: UNI (Italy), Apr. 2020, 23 pages.

* cited by examiner

ADAPTIVE STREAMING OF GEOMETRY-BASED POINT CLOUDS

CROSS-REFERENCE TO RELATED APPLICATIONS

This application is the National Stage Entry under 35 U.S.C. § 371 of Patent Cooperation Treaty Application No. PCT/US2021/038334, filed Jun. 22, 2021, which claims the benefit of Provisional U.S. Patent Application No. 63/042,481, filed Jun. 22, 2020 and Provisional U.S. Patent Application No. 63/084,758, filed Sep. 29, 2020, the disclosure of which is incorporated herein by reference in its entirety.

BACKGROUND

Video coding systems may be used to compress digital video signals, for example, to reduce the storage and/or transmission bandwidth needed for such signals. Video coding systems may include, for example, wavelet-based systems, object-based systems, and/or block-based systems, such as a block-based hybrid video coding system. The video coding systems may support coding and storage aspects of point clouds. However, the systems may lack adequate mechanisms that support streaming point cloud data over a network.

SUMMARY

Systems, methods, and instrumentalities are disclosed for adaptive streaming of visual media content, such as geometry-based point clouds. Elements, attributes, and metadata associated with point cloud components may be signaled, for example, to enable streaming clients to identify point cloud streams and their component sub-streams within a media presentation descriptor (MPD) and to enable streaming clients to select versions of a point cloud and/or its components, for example, based on client-support. In examples, a streaming client may utilize guidance (e.g., an indication signaled in an MPD file) to make determinations about different representations of point cloud content. For example, an indication may indicate which set of representations across different point cloud components constitute a certain quality level. Components of point cloud content may be divided into multiple tiles or tile portions. Clients may stream a particular tile portion (e.g., selected tile portion) of geometry components (e.g., instead of streaming all point cloud data), for example, based on bandwidth availability. Point cloud component tile bitstreams may be available at different adaptation sets, for example, where an adaptation set (e.g., each adaptation set) may represent a point cloud component tile.

Geometry-based point cloud compression (G-PCC) components may be signaled in a dynamic streaming over HTTP (DASH). For example, the G-PCC components may be signaled using a DASH manifest file or an MPD file. In examples, a G-PCC component (e.g., each G-PCC component) may be represented in a DASH MPD file as an adaptation set (e.g., a separate adaptation set). An adaptation set (e.g., a main adaptation set) may serve as the main access point for the G-PCC content. In examples, an adaptation set (e.g., one adaptation set) may be signaled per component per resolution.

A G-PCC component descriptor may be signaled, for example, to enable a streaming client to identify the type of point cloud component in an adaptation set and/or a representation. A G-PCC descriptor may enable a streaming client to distinguish between different point cloud streams present in an MPD file. A streaming client may identify component streams for respective point cloud streams.

A G-PCC preselection may be signaled (e.g., in an MPD), for example, with an identifier (ID) list including, for example, an ID of the main adaptation set for the volumetric media and IDs of the adaptation sets corresponding to the G-PCC components. A preselection may be signaled, for example, using a preselection element within the Period element and/or may be signaled using a preselection descriptor at the adaptation set level.

Multiple versions of G-PCC media may be signaled. Multiple versions of the same point cloud media may be signaled, for example, using separate preselections. PreSelections that represent alternative versions of the same geometry-based point cloud media may include, for example, a G-PCC descriptor with the same attribute value.

One or more G-PCC tiles may be signaled. Tiles bounding box information may be signaled, for example, if multiple tiles in a geometry-based point cloud are present. A client may select a tile ID from the tile inventory bounding box information (e.g., in an MPD), for example, to stream tiled G-PCC components data.

Clients may identify a tile ID for a point cloud component in an adaptation set, for example, by checking a G-PCC component descriptor. A G-PCC Tile ID descriptor may be signaled, for example, to enable a streaming client to distinguish between G-PCC tile streams.

Characteristics of spatial regions and/or mappings between the regions and G-PCC tiles may be signaled, for example, if 3D spatial regions in geometry based volumetric media content are static. Characteristics of spatial regions and/or mappings between the regions and corresponding adaptation sets of G-PCC components may be signaled (e.g., using a G-PCC 3D regions descriptor), for example, if 3D spatial regions are static and/or tile inventory information is not available. A mapping between a spatial region and corresponding adaptation sets of G-PCC components may be signaled (e.g., by a G-PCC region ID descriptor or a G-PCC components descriptor).

A timed-metadata track (e.g., indicating the position and/or dimensions of 3D regions on a presentation timeline) may be signaled (e.g., for dynamic spatial regions) in an adaptation set, for example, with a representation and associated with main G-PCC adaptation set(s).

Streaming client behavior may be based on signaling. A DASH client may be guided, for example, by information provided in an MPD.

Systems, methods, and instrumentalities are disclosed for receiving content related to geometry-based point clouds. In examples, a media presentation description (MPD) file may be received, for example, from a content server. A set of pre-selection elements may be identified from the MPD file. One or more adaptation sets associated with at least one pre-selection element of the set of pre-selection elements may be identified. For example, the one or more adaptation sets may be indicated by an attribute associated with one of the pre-selection elements.

A geometry-based point cloud compression (GPCC) tile identifier associated with a viewport may be determined. For example, the GPCC tile identifier may be determined based on a first descriptor received in the MPD file. In examples, the first descriptor may be a three-dimensional (3D) regions descriptor. The 3D regions descriptor may comprise a region location, one or more region dimensions, and/or a set of tiles associated with a 3D region.

One or more adaptation sets associated with the GPCC tile identifier may be selected using a second descriptor. In examples, the second descriptor may be a component descriptor. The component descriptor may comprise a component type, attribute type, index, and/or a set of ties associated with a bitstream. A point cloud component associated with the selected one or more adaptation sets may be requested. In examples, point cloud component may be received.

Each feature disclosed anywhere herein is described, and may be implemented, separately/individually and in any combination with any other feature disclosed herein and/or with any feature(s) disclosed elsewhere that may be impliedly or expressly referenced herein or may otherwise fall within the scope of the subject matter disclosed herein.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
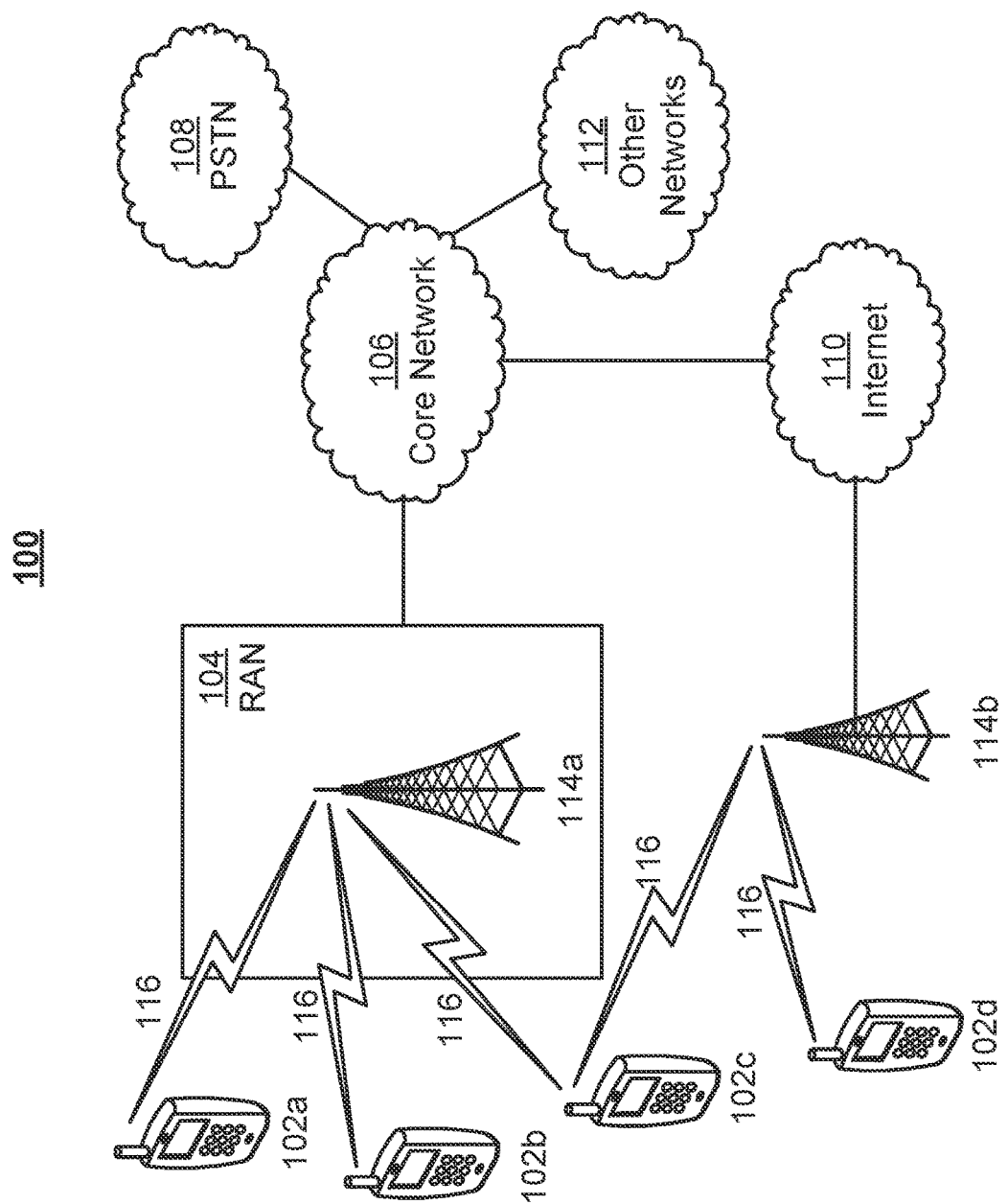
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a. 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide pain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
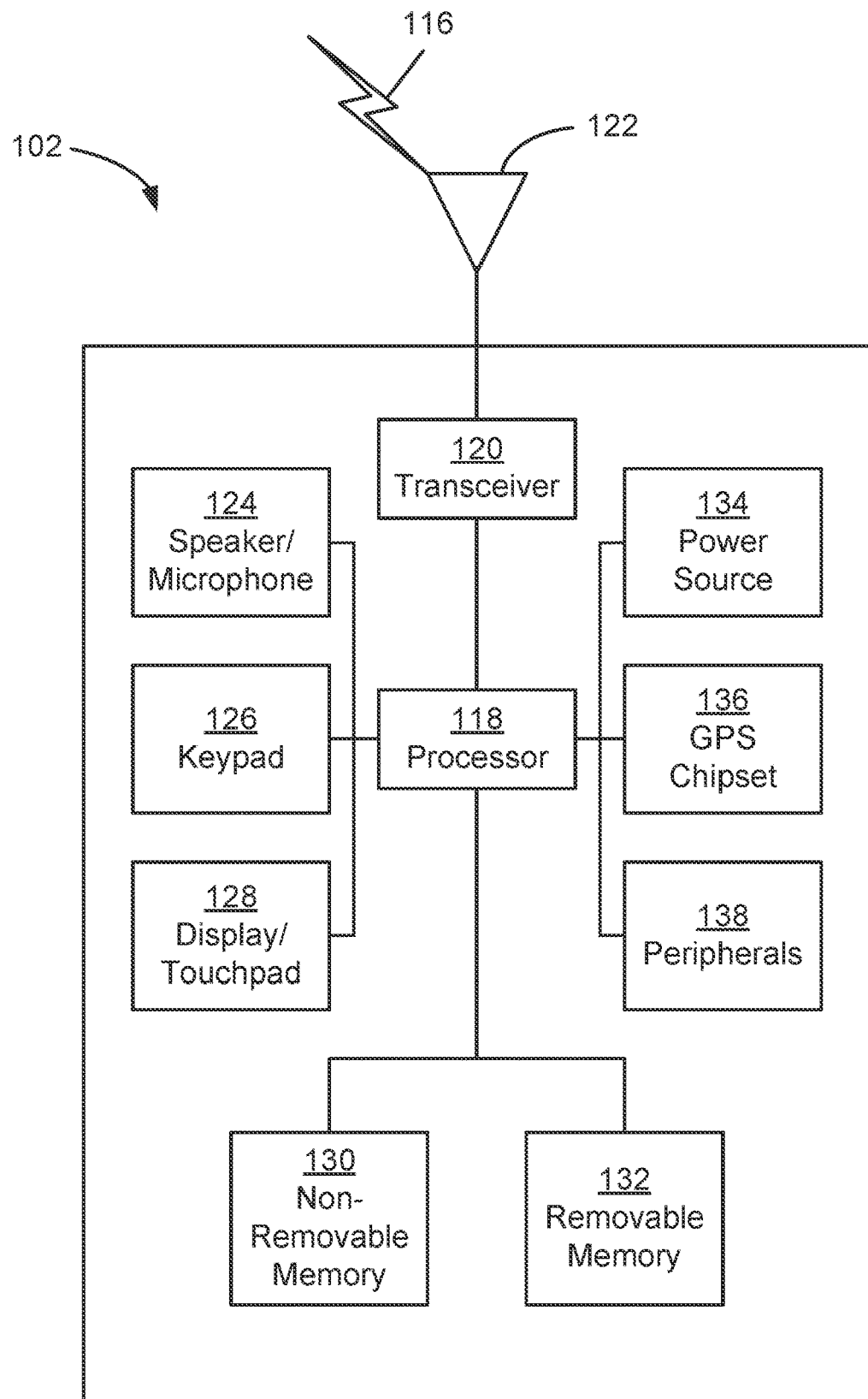
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, alight sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
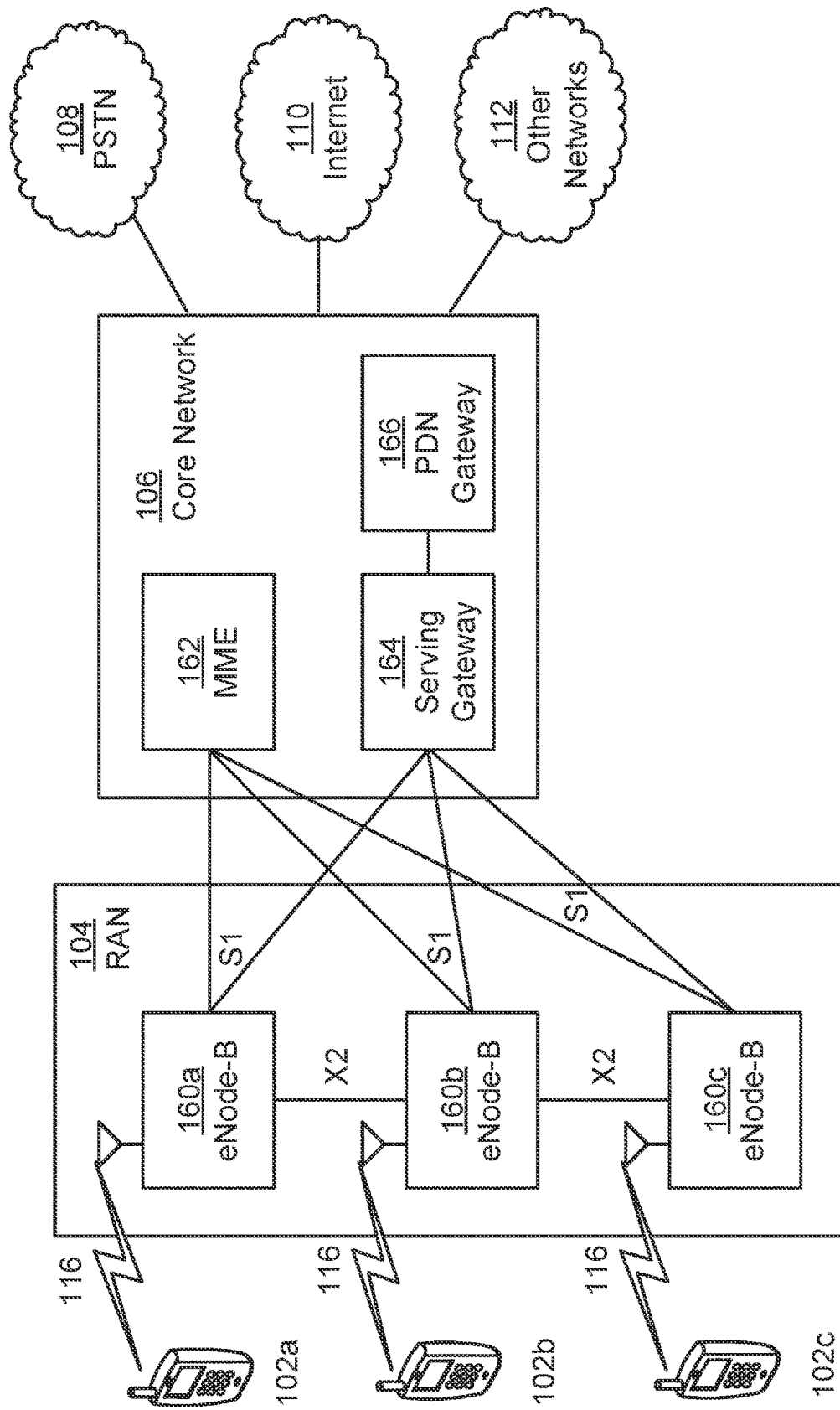
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e LS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac, 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
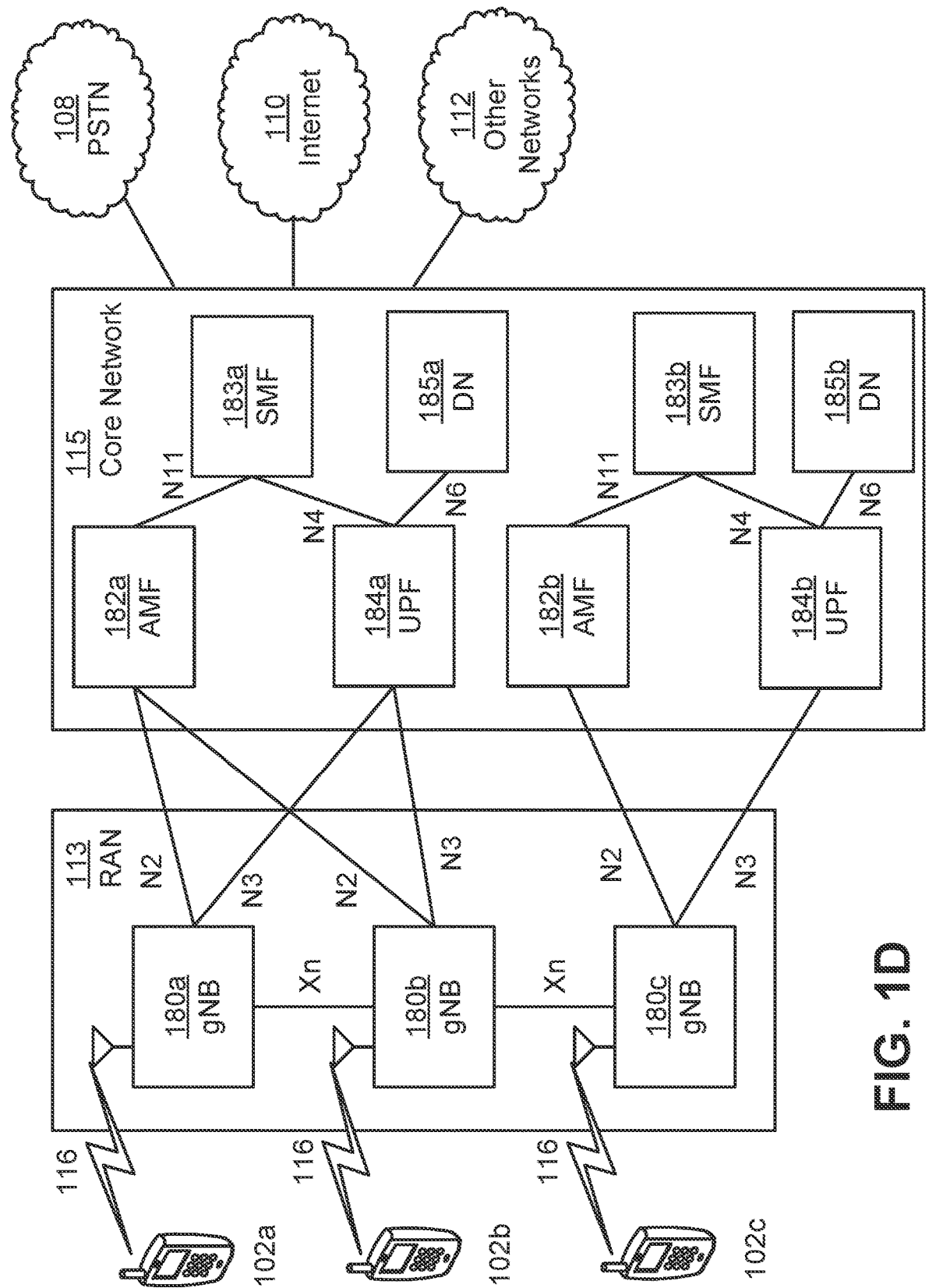
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b. 180c using signals in an unlicensed band. In a non-standalone configuration WTRUs 102a, 102b, 102c may communicate with/connect to gNBs 180a, 180b. 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a. 182b in order to customize CN support for WTRUs 102a. 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b, and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment Direct RF coupling and/or wireless communications via RF circuitry (e.g., which may include one or more antennas) may be used by the emulation devices to transmit and/or receive data.

This application describes a variety of aspects, including tools, features, examples or embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 5-8 described herein may provide some embodiments, but other embodiments are contemplated. The discussion of FIGS. 5-8 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
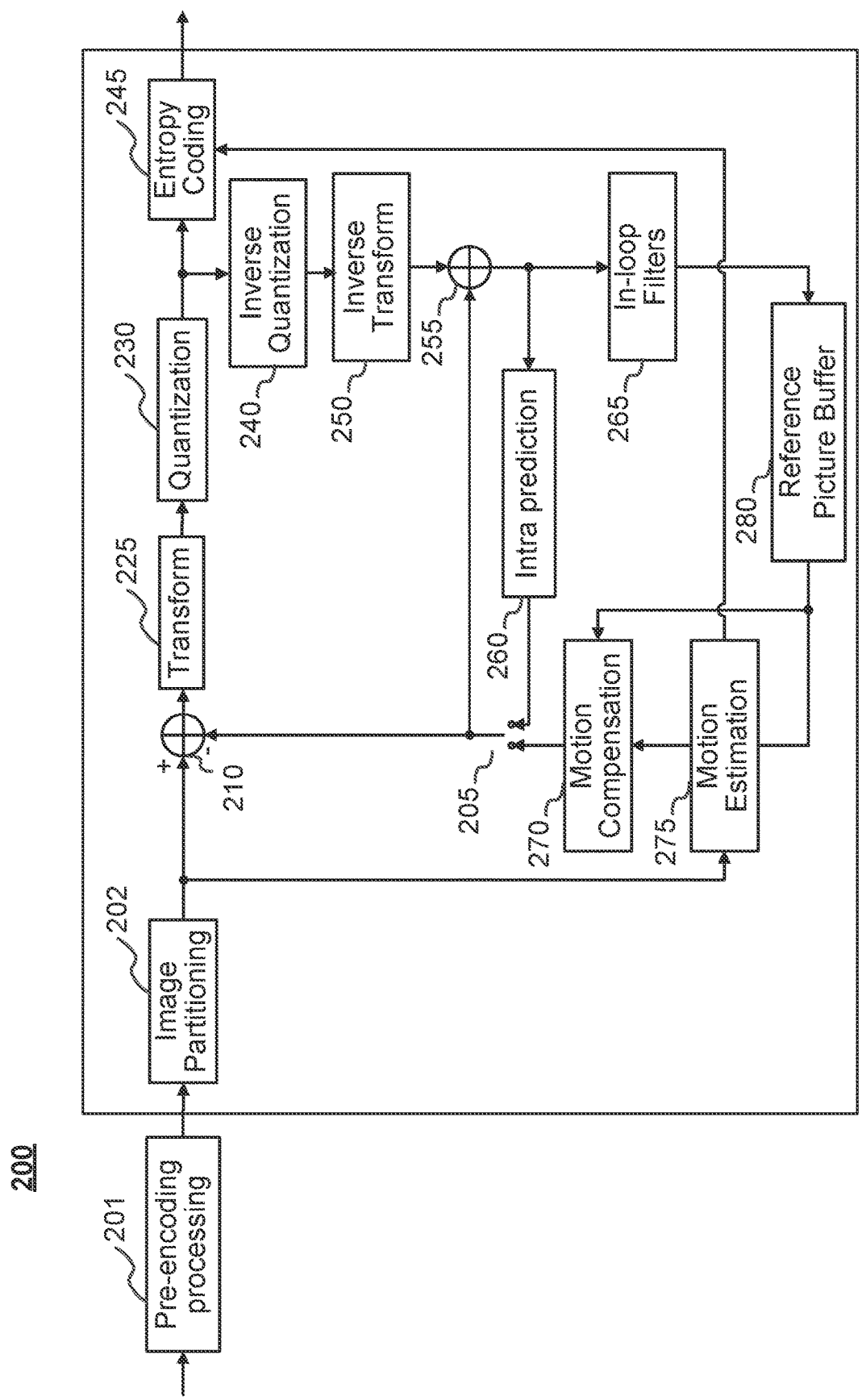
FIG. 2 is a diagram showing an example video encoder.
Figure 3:
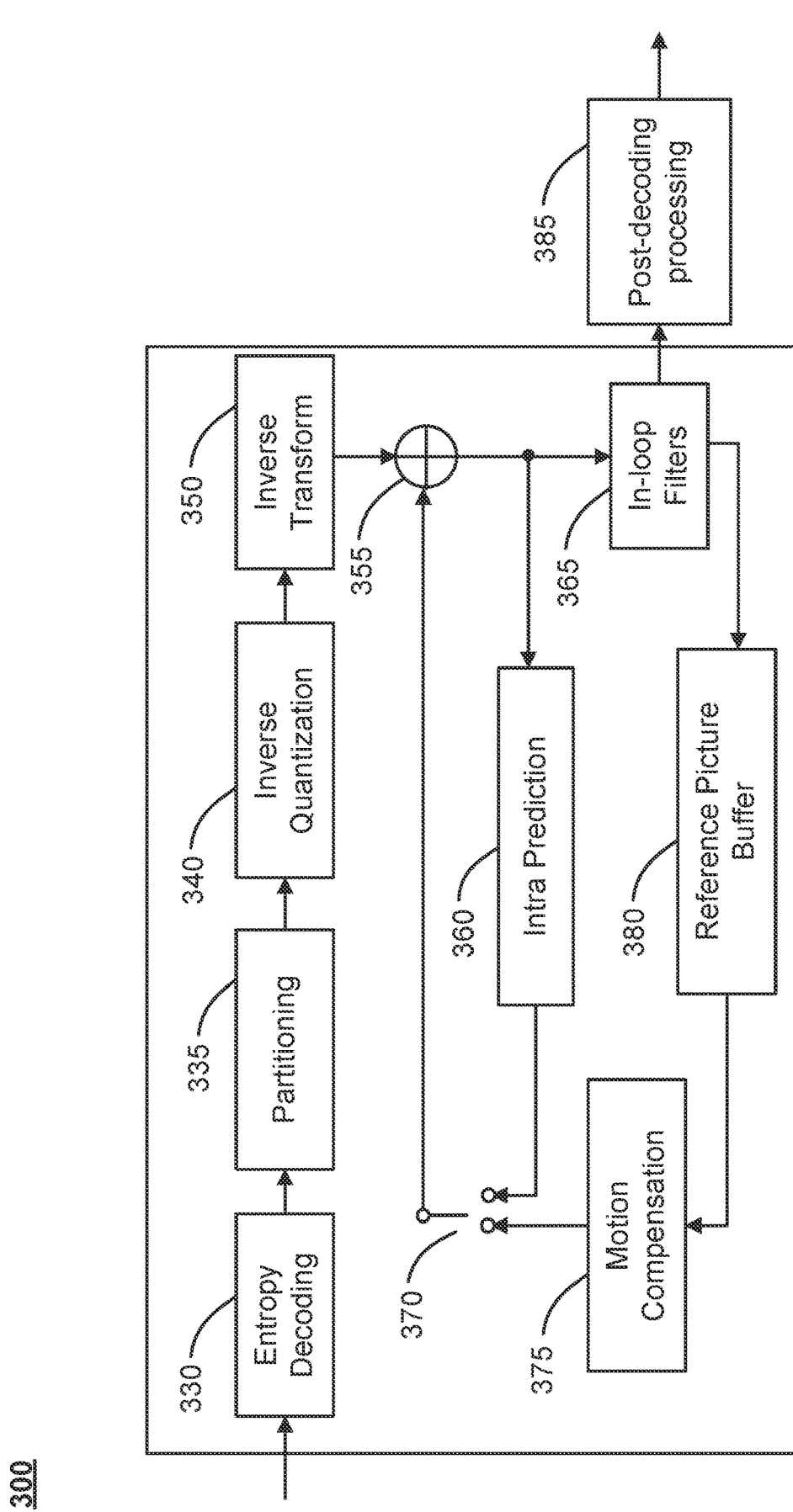
FIG. 3 is a diagram showing an example of a video decoder.

Various methods and other aspects described in this application may (for example, be used to) modify modules, for example, pre-encoding processing 201, intra prediction 260, entropy coding 245 and/or entropy decoding modules 330, intra prediction 360, post-decoding processing 385, of a video encoder 200 and a video decoder 300 as shown in FIG. 2 and FIG. 3 respectively. Moreover, the subject matter disclosed herein presents aspects that are not limited to VVC or HEVC, and may be applied, for example, to any type, format or version of video coding, whether described in a standard or a recommendation, whether pre-existing or future-developed, and extensions of any such standards and recommendations (e.g., including VVC and HEVC). Unless indicated otherwise, or technically precluded, the aspects described in this application may be used individually or in combination.

Various numeric values are used in examples described the present application, such as minimum and maximum value ranges (for example, 0 to 1, 0 to N or 0 to 255), bit values for indications or determinations, default values, ID numbers (for example, for adaptation IDs), etc. These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 may also generally perform video decoding as part of encoding video data. For example, the encoder 200 may perform one or more of the video decoding steps presented herein. The encoder reconstructs the decoded images, for example, to maintain synchronization with the decoder with respect to one or more of the following: reference pictures, entropy coding contexts, and other decoder-relevant state variables.

In particular, the input of the decoder includes a video bitstream, which may be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g., conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream.

Figure 4:
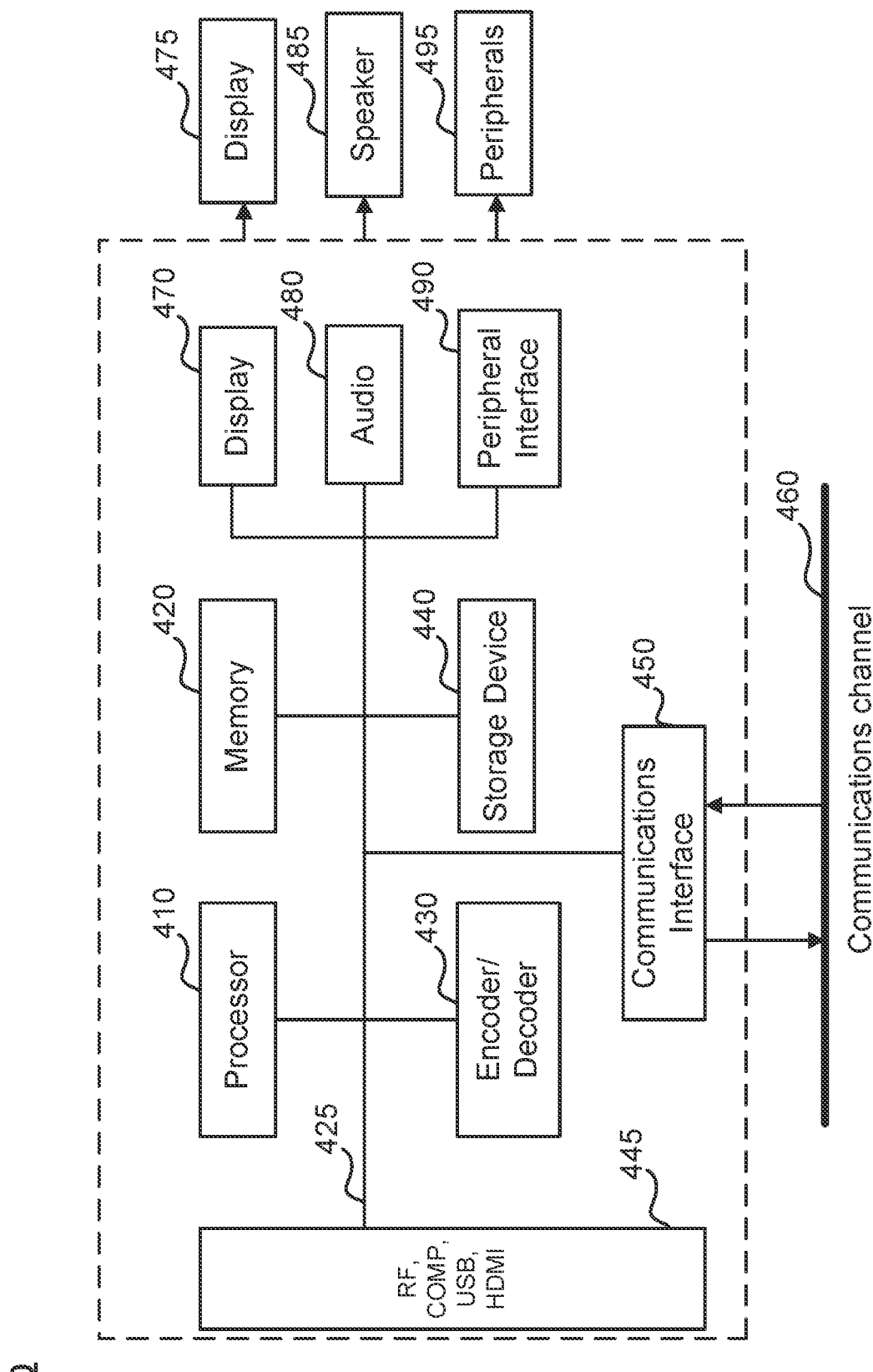
FIG. 4 is a diagram showing an example of a system in which various aspects and examples may be implemented.

FIG. 4 is a diagram showing an example of a system in which various aspects and embodiments described herein may be implemented. System 400 may be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various embodiments, the system 400 is communicatively coupled to one or more other systems, or other electronic devices, via, for example, a communications bus or through dedicated input and/or output ports. In various embodiments, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (e.g., a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various embodiments, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 410 and/or the encoder/decoder module 430 is used to store instructions and to provide working memory for processing that is needed during encoding or decoding. In other embodiments, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as, for example, MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various embodiments, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the data stream as necessary for presentation on an output device.

Various elements of system 400 may be provided within an integrated housing. Within the integrated housing, the various elements may be interconnected and transmit data therebetween using suitable connection arrangement 425, for example, an internal bus as known in the art, including the Inter-IC (I2C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various embodiments, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these embodiments is typically connected to an access point or router that provides access to external networks including the Internet for allowing streaming applications and other over-the-top communications. Other embodiments provide streamed data to the system 400 using a set-top box that delivers the data over the HDMI connection of the input block 445. Still other embodiments provide streamed data to the system 400 using the RF connection of the input block 445. As indicated above, various embodiments provide data in a non-streaming manner. Additionally, various embodiments use wireless networks other than Wi-Fi, for example a cellular network or a Bluetooth network.

The system 400 can provide an output signal to various output devices, including a display 475, speakers 485, and other peripheral devices 495. The display 475 of various embodiments includes one or more of, for example, a touchscreen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples of embodiments, one or more of a stand-alone digital video disc (or digital versatile disc) (DVR, for both terms), a disk player, a stereo system, and/or a lighting system. Various embodiments use one or more peripheral devices 495 that provide a function based on the output of the system 400. For example, a disk player performs the function of playing the output of the system 400.

In various embodiments, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various embodiments, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various embodiments in which the display 475 and speakers 485 are external components, the output signal may be provided via dedicated output connections, including, for example, HDMI ports, USB ports, or COMP outputs.

The embodiments may be carried out by computer software implemented by the processor 410 or by hardware, or by a combination of hardware and software. As a non-limiting example, the embodiments may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, may encompass all or part of the processes performed, for example, on a received encoded sequence in order to produce a final output suitable for display. In various embodiments, such processes may include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, receiving, decoding and interpreting signals (for example, as described herein) indicating elements, attributes and metadata associated with point cloud components; identifying point cloud streams and their component sub-streams within a media presentation descriptor (MPD); identifying versions of a point cloud and/or its components; decoding an MPD to identify a main adaptation set and other adaptation sets to identify geometry-based point cloud compression (G-PCC) components in G-PCC content decoding an MPD to identify the type of point cloud component in an adaptation set or a representation; decoding an MPD to identify one or more preselections; decoding an MPD to identify one or more versions of G-PCC media; decoding an MPD to identify one or more G-PCC tile groups; decoding an MPD to identify one or more tile Is for a G-PCC component in an adaptation set decoding an MPD to identify one or more characteristics of spatial regions and mappings between the regions and G-PCC tiles, characteristics of spatial regions and mappings between the regions and corresponding adaptation sets of G-PCC components, and/or a mapping between a spatial region and corresponding adaptation sets of G-PCC components; decoding an MPD to identify a timed-metadata track for dynamic spatial regions; etc.

As further embodiments, in one example decoding may refer to entropy decoding, in another embodiment decoding may refer to differential decoding, and in another embodiment decoding may refer to a combination of entropy decoding and differential decoding. Whether the phrase decoding process is intended to refer specifically to a subset of operations or generally to the broader decoding process will be clear based on the context of the specific descriptions and is believed to be well understood by those skilled in the art.

Various implementations may involve encoding. In an analogous way to the above discussion about decoding, encoding as used in this application may encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, generating, encoding and sending signals (for example, as described herein) indicating elements, attributes and metadata associated with point cloud components; encoding an MPD to indicate point cloud streams and their component sub-streams; encoding an MPD to indicate a main adaptation set and other adaptation sets to support identification of geometry-based point cloud compression (G-PCC) components in G-PCC content encoding an MPD to support identification of the type of point cloud component in an adaptation set or a representation; encoding an MPD to identify one or more preselections; encoding an MPD to support identification of one or more versions of G-PCC media; encoding an MPD to support identification of one or more G-PCC tile groups; encoding an MPD to support identification of one or more tile IDs for a G-PCC component in an adaptation set; encoding an MPD to support identification of one or more characteristics of spatial regions and mappings between the regions and G-PCC tiles, characteristics of spatial regions and mappings between the regions and corresponding adaptation sets of G-PCC components, and/or a mapping between a spatial region and corresponding adaptation sets of G-PCC components; decoding an MPD to identify a timed-metadata track for dynamic spatial regions; etc.

As further examples, in one embodiment encoding may refer to entropy encoding, in another embodiment encoding may refer to differential encoding, and in another embodiment encoding may refer to a combination of differential encoding and entropy encoding. Whether the phrase encoding process is intended to refer specifically to a subset of operations or generally to the broader encoding process will be clear based on the context of the specific descriptions and is believed to be well understood by those skilled in the art.

Note that syntax elements as used herein, such as syntax elements that may be indicated in Tables 1-23 and otherwise indicated in discussion or figures presented herein, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

During the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may be used, to save encoding complexity, in particular with computation of an approximated distortion based on the prediction or the prediction residual signal, not the reconstructed one. Mix of these two approaches may be used, for example, by using an approximated distortion for some of the possible encoding options, and a complete distortion for other encoding options. Other approaches may evaluate a subset of the possible encoding options. More generally, many approaches employ any of a variety of techniques to perform the optimization, but the optimization is not necessarily a complete evaluation of both the coding cost and related distortion.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants (PDAs), and other devices that facilitate communication of information between end-users.

Reference to "one embodiment," "an embodiment," "an example," "one implementation" or "an implementation," as well as other variations thereof, means that a particular feature, structure, characteristic, and so forth described in connection with the embodiment is included in at least one embodiment. Thus, the appearances of the phrase "in one embodiment," "in an embodiment," "in an example," "in one implementation," or "in an implementation", as well any other variations, appearing in various places throughout this application are not necessarily all referring to the same embodiment or example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in some embodiments the encoder signals (e.g., to a decoder) an MPD, adaptation set, a representation, a preselection, G-PCC components, a G-PCCComponent descriptor, a G-PCC descriptor or an essential property descriptor, a supplemental property descriptor, a G-PCC tile inventory descriptor, G-PCC static spatial regions descriptor, GPCCTileId descriptor GPCC3DRegionID descriptor, among other descriptors, elements and attributes, metadata, schemas, etc. (for example, as disclosed herein, including in Tables 1-23), etc. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described embodiment Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

3D point clouds may represent (e.g., be used to represent) immersive media. A point cloud may comprise a set of points represented in three dimensional (3D) space. In examples, a point (e.g., each point) may be associated with one or more coordinates that indicate the location of the point and/or one or more attributes (e.g., point color, transparency, time of acquisition, reflectance of laser, material property, etc.). Point clouds may be captured or deployed, for example, using one or more cameras, depth sensors, and/or light detection and ranging (LiDAR) laser scanners. Point clouds may comprise a plurality of points. In examples, a point (e.g., each point) may be represented by a set of coordinates (for example, x, y, z coordinates) that map in 3Dspace. A point may be generated based on the sampling of an object. In examples, the number of points within a point cloud may be in the order of millions or billions. A point cloud may be used to reconstruct one or more objects and/or scenes. Point clouds may be represented and/or compressed, for example, to store and/or transmit (e.g., efficiently store and/or transmit) point cloud data Point cloud compression may support lossy and/or lossless coding (e.g., encoding or decoding) of a point cloud's geometric coordinates and/or attributes. Point clouds may be deployed to support various applications (e.g., tele-presence, virtual reality (VR), and/or large-scale dynamic 3D maps). In an example, libraries for mesh and point cloud compression may support compression of vertex positions, normals, colors, texture coordinates, and other generic vertex attributes, for example, to improve the efficiency and speed of transmitting 3D content. An example of such a library is DRACO™, developed by GOOGLE™.

Figure 5:
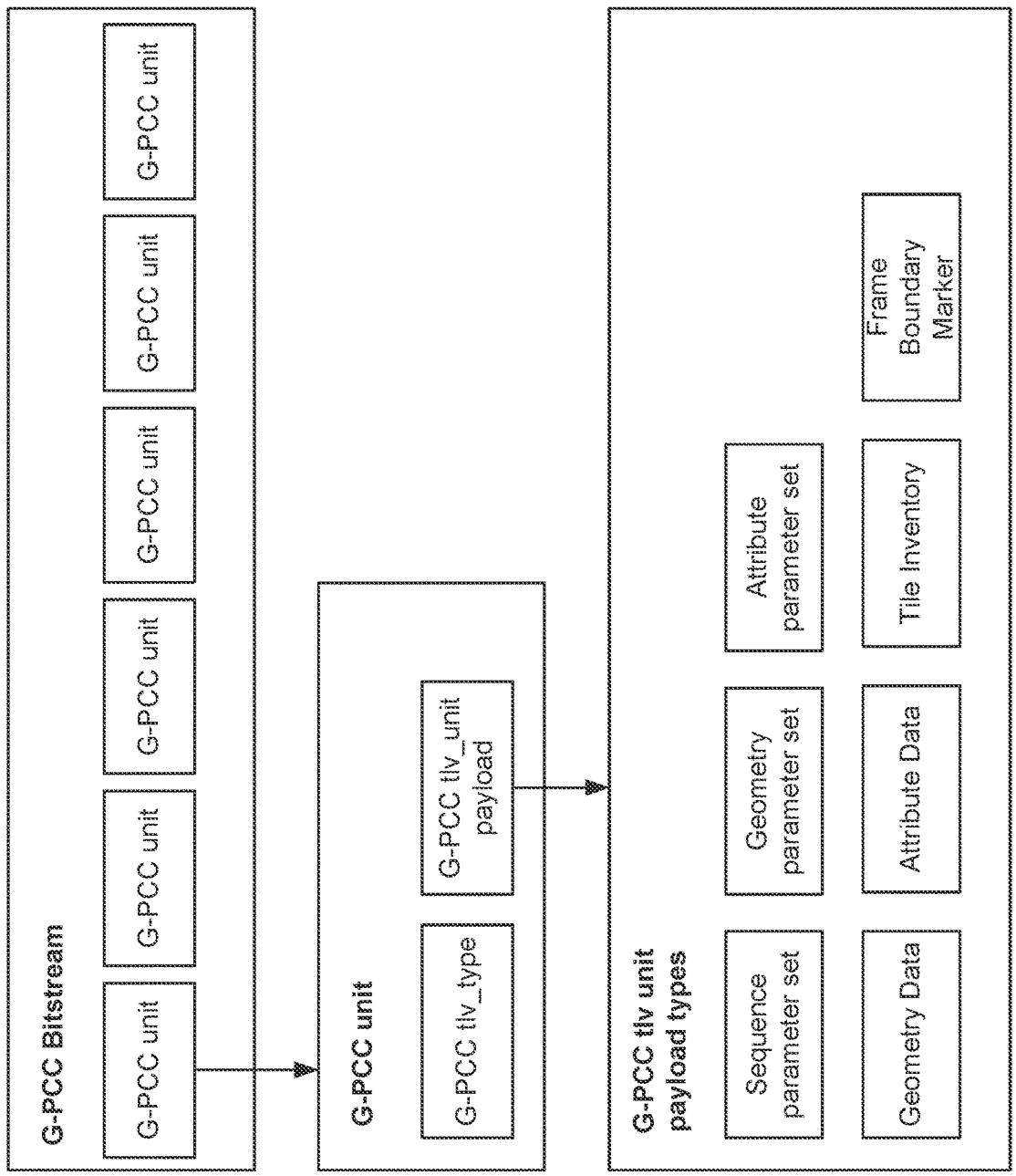
FIG. 5 illustrates an example of a bitstream structure for geometry-based point cloud compression (G-PCC).

FIG. 5 illustrates an example of a bitstream structure for geometry-based point cloud compression (G-PCC). A G-PCC bitstream may comprise a set of G-PCC units, for example, which may be referred to as type-length-value (TLV) encapsulation structures, for example, as shown in FIG. 5. G-PCC and GPCC may be used interchangeably herein. As illustrated in FIG. 5, a G-PCC unit may include information about the G-PCC tlv_type and G-PCC tlv unit payload. FIG. 5 illustrates various tlv unit payload types. Table 1 shows an example of G-PCC TLV unit syntax. In examples, a G-PCC TLV unit (e.g., each G-PCC TLV unit) may comprise a TLV type, a G-PCC TLV unit payload length, and/or a G-PCC TLV unit payload. A TLV type (e.g., tlv_type as shown in Table 1) may indicate a G-PCC unit type. Table 2 shows an example of TLV types (e.g., tlv_type as shown in Table 1) and associated data unit descriptions. For example, a G-PCC TLV unit with unit type 2 may be a geometry data unit and a G-PCC TLV unit with unit type 4 may be an attribute data unit. A point cloud may be reconstructed, for example, based on a geometry data unit and an attribute data unit Geometry and/or attribute G-PCC unit payloads may correspond to media data units (e.g., TLV units), for example, which may be decoded by a G-PCC decoder. Geometry and attribute parameter set G-PCC units may specify a G-PCC decoder to decode corresponding TLV units. A G-PCC bitstream high-level syntax (HLS) may support slice and/or tile groups for geometry and attribute data. A frame may be partitioned into multiple tiles and slices. A slice may be a set of points that may be encoded or decoded (e.g., encoded or decoded independently). In examples, a slice may comprise a geometry data unit and zero or more attribute data units. Attribute data units may depend upon the corresponding geometry data unit, for example, within the same slice. Within a slice, the geometry data unit may appear before any associated attribute units. Data units of a slice may be contiguous. The ordering of slices within a frame may be unspecified. A group of slices may be identified by a common tile identifier. A tile inventory that describes a bounding box for a tile (e.g., each tile) may be implemented. A tile may overlap another tile in the bounding box. Each slice may include an index that identifies to which tile the slice belongs. Table 1 shows an example of G-PCC TLV encapsulation unit payload syntax, Table 2 shows an example of G-PCC TLV types and data unit descriptions, and Table 3 shows an example of G-PCC TLV encapsulation unit payload syntax.

TABLE 1

|  | Descriptor |
|---|---|
| tlv_encapsulation( ) { | |
|   tlv_type | u(8) |
|   tlv_num_payload_bytes | u(32) |
|   for( i = 0; i < tlv_num_payload_bytes; i++ ) | |
|     tlv_payload_byte[ i ] | u(8) |
| } | |

TABLE 2

| tlv_type | Description |
|---|---|
| 0 | Sequence parameter set |
| 1 | Geometry parameter set |

TABLE 2-continued

| tlv_type | Description |
| --- | --- |
| 2 | Geometry data unit |
| 3 | Attribute parameter set |
| 4 | Attribute data unit |
| 5 | Tile inventory |
| 6 | Frame boundary marker |

TABLE 3

| | Descriptor |
| --- | --- |
| tlv_payload( ) { | |
|   if( tlv_type == GPCC_SRS ) | |
|     sequence_parameter_set( ) | |
|   else if( tlv_type == GPCC_GPS ) | |
|     geometry_parameter_ set ( ) | |
|   else if(tlv_type == GPCC_APS ) | |
|     attribute_parameter_set ( ) | |
|   else if(tlv_type == GPCC_GD ) | |
|     geometry_data_unit ( ) { | |
|       geometry_data_unit_header( ) | |
|       geometry_data_unit_data( ) | |
|     } | |
|   else if(tlv_type == GPCC_AD ) | |
|     attribute_data_unit ( ) { | |
|       attribute_data_unit_header( ) | |
|       attribute_data_unit_data( ) | |
|     } | |
| } | |

Examples of elements, attributes, syntax, and semantics are shown and described herein. Elements are distinguished from attributes. Attributes may be identified by an "@" preceding the attribute. Examples of element use value ranges may be provided in the following format: <minimum> . . . <maximum>, where a value of N may indicate a value is unbounded. Elements, attributes, syntax and semantics described herein are non-limiting examples that may or may not be implemented alone or in various combinations, with or without example uses, in various implementations.

Figure 6:
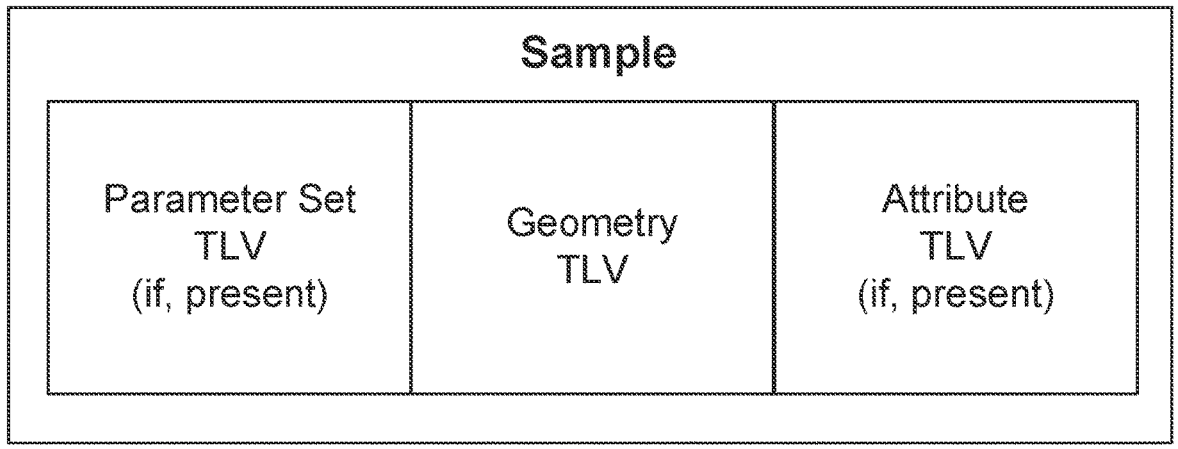
FIG. 6 illustrates an example of a sample structure when the G-PCC geometry and attribute bitstream are stored in a single track.

A G-PCC container file format may be implemented. FIG. 6 illustrates an example of a sample structure when the GPCC geometry and attribute bitstream may be stored in a single track. A video coding device may require a G-PCC encoded bitstream to be represented by a single-track declaration, fore example, if the GPCC bitstream is carried in a single track. Single-track encapsulation of GPCC data may utilize a simple encapsulation, for example, an ISO base media file format (ISOBMFF) encapsulation, such as by storing the G-PCC bitstream in a single track, for example, without processing (e.g., further processing). A sample (e.g., each sample) in the single track (e.g., each sample in the track) may include one or more GPCC components. Each sample may comprise one or more TLV encapsulation structures.

Figure 7:
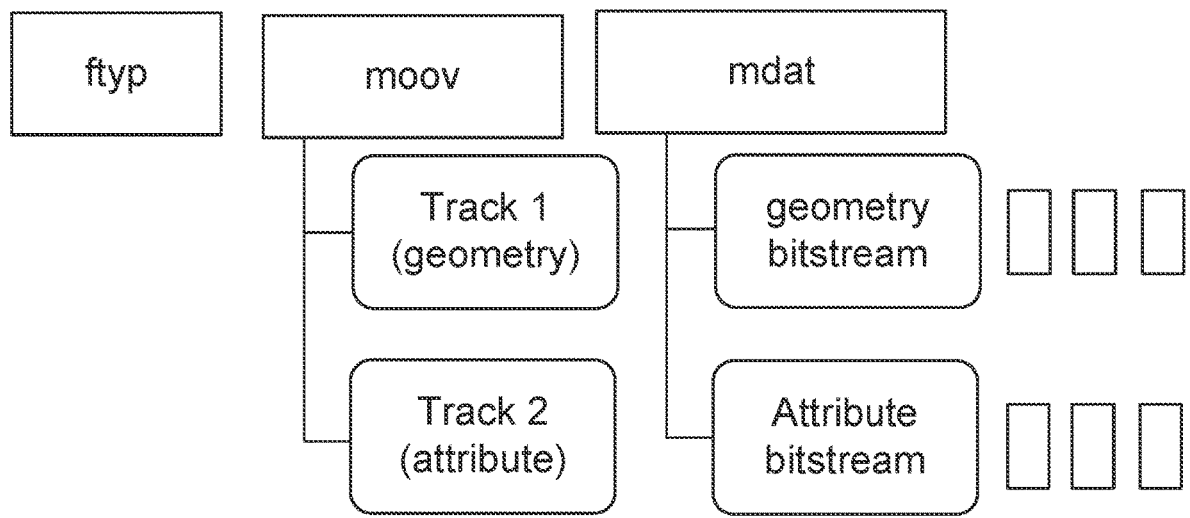
FIG. 7 illustrates an example of a multi-track G-PCC container.

FIG. 7 illustrates an example of a multi-track (e.g., an ISOBMFF) G-PCC container structure. With the coded G-PCC geometry bitstream and the coded G-PCC attribute bitstream(s) stored in separate tracks, each sample in a track may include at least one TLV encapsulation structure carrying G-PCC component data.

A multi-track G-PCC ISOBMFF container may include a G-PCC track which includes a Geometry parameter set, Sequence parameter set, and/or geometry bitstream samples carrying geometry data TLV units. The G-PCC track may include track references to other tracks carrying the payloads of G-PCC attribute component(s). A multi-track G-PCC ISOBMFF container may include zero or more G-PCC tracks each including the respective attribute's Attribute parameter set, and attribute bitstream samples carrying attribute data TLV units.

When a G-PCC bitstream is carried in multiple tracks, a track reference tool may be used to link between G-PCC component tracks. For example, a TrackReferenceType-Boxes may be added to a TrackReferenceBox within the TrackBox of the G-PCC track. The TrackReferenceTypeBox may include an array of track_IDs, for example, designating the tracks which the G-PCC track references. To link the G-PCC geometry track to the G-PCC attribute track, reference_type of a TrackReferenceTypeBox in the G-PCC geometry track may be implemented to identify the associated attribute tracks. The 4CCs of the track reference types may be 'gpca.' In examples, the referenced track(s) may include the coded bitstream of G-PCC attribute data.

When the geometry stream of the G-PCC bitstream includes multiple tiles, each tile or a group of tiles may be encapsulated in a separate track, such as a geometry tile track. In examples, the geometry tile track may carry TLV units of one or more geometry tiles, which may enable direct access to the tiles. The attribute stream(s) of the G-PCC bitstream include multiple tiles may be carried in multiple attribute tile tracks.

The G-PCC tile(s) data may be carried in separate geometry and attribute tile tracks in the container. Partial access in ISOBMFF containers for G-PCC coded streams may be supported. Tiles corresponding to a spatial region within the point cloud scene may be signaled in the samples of a timed-metadata track, such as a track with a Dynamic3DSpatialRegionSampleEntry, or in a GPCCSpatialRegionInfoBox box. This may enable players and/or streaming clients to retrieve the set of tile tracks carrying the information needed to render certain spatial regions or tiles within the point cloud scene.

A G-PCC base track may carry the TLV encapsulation structures. The TLV encapsulation structures may contain (e.g., may only contain) sequence parameter set (SPS), geometry parameter set (GPS), attribute parameter set (APS), and tile inventory information. To link the G-PCC base track to the geometry tile tracks, a track reference with a new track reference type may be defined using the four-character code (4CC): 'gccg'. Track references of the new type may be used to link the G-PCC base track with the geometry tile tracks (e.g., each of the geometry tile tracks).

A geometry tile track (e.g., each geometry tile track) may be linked with the other attribute(s) G-PCC tile tracks carrying attribute information of the respective tile or tile group using the track reference tool. The 4CCs of these track reference types may be 'gpca'.

Track alternatives may be indicated by an alternate tracks mechanism (e.g., alternate_group field of the TrackHeaderBox). In examples, G-PCC component tile tracks which comprise the same alternate_group value may be different encoded versions of the same G-PCC component A volumetric visual scene may be coded in alternatives. In such a case, G-PCC tracks, for example, which are alternatives of each other, may comprise the same alternate_group value in their TrackHeaderBox.

G-PCC component tile tracks may include alternatives. In such a case, the G-PCC component tile tracks (e.g., all the G-PCC component tile tracks) that belong to an alternative group may be referenced by the G-PCC base track and/or the respective G-PCC geometry tile track. In examples, G-PCC component tile tracks which are alternatives of each other may use the alternate grouping mechanism.

MPEG dynamic adaptive streaming over HTTP (MPEG-DASH) is a delivery format that may dynamically adapt to changes in network delivery conditions, for example, to provide end users with a video experience (e.g., a better video experience).

Dynamic HTTP streaming may deliver multimedia content at one or more bitrates that may be available at a server. Multimedia content may comprise a plurality of media components (e.g., audio, video, and/or text media components). Different media components may comprise different characteristics. One or more characteristics of media components may be described, for example, by a media presentation description (MPD).

Figure 8:
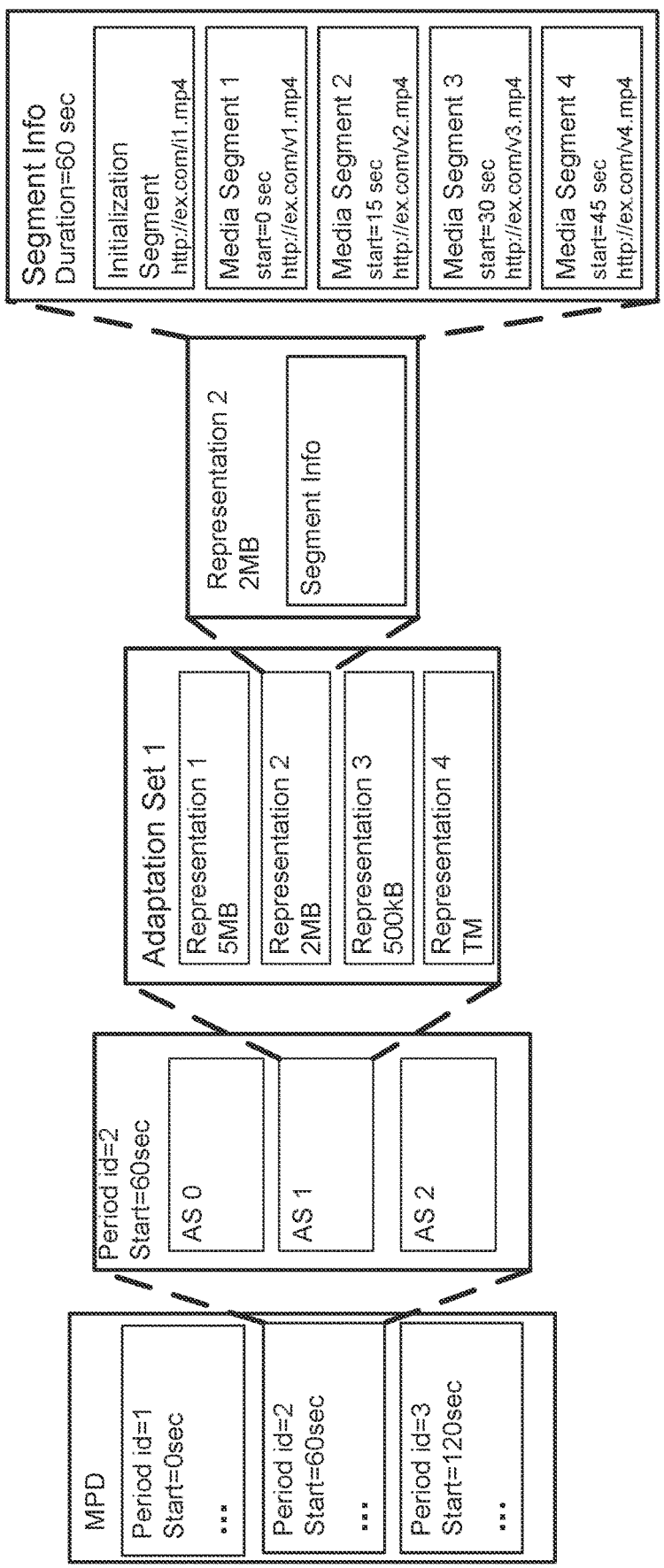
FIG. 8 illustrates an example Media Presentation Description (MPD) hierarchical data model.

FIG. 8 illustrates an example MPD hierarchical data model. As illustrated in FIG. 8, the MPD may describe a sequence of periods (e.g., time intervals). For example, a set of encoded versions of media content components may not change during a period. A period (e.g., each period) may have a start time and a duration associated with it A period (e.g., each period) may be include one or more adaptation sets (e.g., AdaptationSet, such as Adaptation Set 1, as illustrated in FIG. 8). Adaptation Set, adaptation set, AdaptationSet, and adaptationset may be used interchangeably herein. In an example, a DASH streaming client may be a WTRU, for example, as described herein with respect to FIGS. 1A-1D. In another example, a DASH streaming client may include a head mounted device, a head mounted projector, and/or a head-up display. In another example, a DASH streaming client may include a 3D television. In another example, a DASH streaming client may include one or more cameras (e.g., advanced cameras).

An adaptation set (e.g., Adaptation Set, adaptation set, AdaptationSet, or adaptationset) may represent a set of encoded versions of one or more media content components, for example, sharing one or more properties (e.g., identical properties), such as one or more of language, media type, picture aspect ratio, role, accessibility, viewpoint, rating property, and/or the like). In examples, an AdaptationSet may include different bitrates for geometry and/or attribute components of the multimedia content (e.g., G-PCC content). An AdaptationSet may include different bitrates for an audio component (e.g., lower quality stereo and/or higher quality surround sound) of multimedia content (e.g., the same multimedia content). In examples, an AdaptationSet (e.g., each Adaption Set) may include multiple Representations.

A Representation may describe a deliverable encoded version of one or more media components. Representation and representation may be used interchangeably herein. A Representation may vary from other Representations, for example, by bitrate, resolution, number of channels, and/or other characteristics. A Representation (e.g., each Representation) may comprise one or more segments. Attributes of a Representation element (e.g., @id, @bandwidth, @qualityRanking, and/or @dependencyId) may (e.g., may be used to) specify one or more properties of the Representation.

A Segment may be retrieved with an HTTP request. A segment (e.g., each segment) may comprise a URL (e.g., an addressable location on a server). In examples, a segment may be downloaded, for example, using HTTP GET or HTTP GET with byte ranges.

A DASH client may parse an MPD XML document. For example, a DASH client may select a collection of AdaptationSets (e.g., suitable for the DASH client's environment), for example, based on the AdaptationSet's elements (e.g., information provided in each of the AdaptationSet's elements). A client may select a Representation for an AdaptationSet (e.g., within each AdaptationSet). The client may select the Representation, for example, based on the value of @bandwidth attribute, client coding capabilities, and/or client rendering capabilities. A client may download an initialization segment of a selected Representation. A client may access content (e.g., by requesting entire segments or byte ranges of segments). A client may continue consuming media content, for example, if a presentation has started or during a presentation. A client may request (e.g., continuously request) media segments and/or parts of media segments during a presentation. A client may play content according to a media presentation timeline. A client may switch from a first Representation to a second Representation, for example, based on updated information from the client's environment A client may play the content continuously, for example, across one or more Periods. A media presentation (e.g., being consumed by a client in segments) may be terminated, a period may be started, and/or an MPD may be re-fetched, for example, towards the end of announced media in a Representation.

MPEG-DASH descriptors may provide application-specific information about media content Descriptor element structures may be similar. A descriptor element may include, for example, a @schemeIdUri attribute that may provide a URI to identify a scheme, an attribute @value, and/or an attribute @id. Element semantics may be specific to the scheme employed. A URI identifying the scheme may be, for example, a URN or a URL. An MPD may provide information on how to use elements. An application that employs DASH formats may instantiate description elements, for example, with scheme information. DASH applications that use elements (e.g., descriptor elements) may define (e.g., first define) a scheme identifier (e.g., in the form of a URI) and may define a value space for the element (e.g., for when the scheme identifier is used). In examples, an extension element and/or attribute may be defined in a separate namespace, for example, for structured data. Descriptors may appear at a number of levels within an MPD. For example, the presence of an element at an MPD level may indicate that the element is a child of the MPD element. For example, the presence of an element at an adaptation set level may indicate that the element is a child element of an AdaptationSet element. For example, the presence of an element at a Representation level may indicate that the element is a child element of a Representation element.

A bundle (e.g., in MPEG-DASH) may be a set of media components that may be consumed jointly by a decoder instance (e.g., a single decoder instance). A bundle (e.g., each bundle) may include a media component (e.g., main media component) that may include decoder-specific information and/or may bootstrap the decoder. A PreSelection may refer to, identify, and/or define a subset of media components in a bundle, for example, that may be consumed jointly (e.g., expected to be consumed jointly).

An AdaptationSet that includes a main media component may be referred to as a Main Adaptation Set. Main Adaptation Set, main Adaptation Set, and main adaptation set (e.g., and any variations based on capitalization or compounding of adaptation set (e.g., adaptationset)) may be used interchangeably herein. A main media component may be included in a PreSelection that may be associated with a bundle. A bundle (e.g., each bundle) may include one or multiple partial AdaptationSets. Partial AdaptationSets may be processed in combination with a Main AdaptationSet.

Table 4 shows an example of PreSelection element semantics. PreSelections may be defined, for example, through a PreSelection element, for example, as shown in Table 4. In examples, a selection of PreSelections may be based on attributes and/or elements that may be included in the PreSelection element.

TABLE 4

| Element or Attribute Name | Use | Description |
| --- | --- | --- |
| Preselection | | |
| @id | default = 1 | Specifies the identifier (ID) of a Preselection. This may be unique within a (for example, one) Period. |
| @preselectionComponents | | Specifies the IDs of included Adaptation Sets or Content Components that may belong to the Preselection, for example, as a white space separated list in processing order, where the first ID may be the ID of the main media component. |
| @lang | | Declares the language code for the PreSelection (for example, according to the syntax and semantics in IETF RFC 5646). |
| Accessibility | 0 . . . N | Specifies information about accessibility scheme. |
| Role | 0 . . . N | Specifies information about role annotation scheme. |
| Rating | 0 . . . N | Specifies information about rating scheme. |
| Viewpoint | 0 . . . N | Specifies information about viewpoint annotation scheme. |
| CommonAttributesElements | | Specifies the common attributes and elements (attributes and elements from base type RepresentationBaseType). |

Multimedia applications, such as virtual reality (VR) and immersive 3D graphics, may be implemented with or represented by 3D point clouds, which may enable updated forms of interaction and/or communication with one or more virtual worlds. Static and dynamic point clouds may generate a large volume of information. Efficient coding algorithms may be used to compress point cloud information, for example, to reduce storage and/or transmission resource utilization by point cloud information. For example, a bitstream of compressed dynamic point cloud information may utilize fewer transmission resources than a bitstream of uncompressed information.

Point cloud applications may utilize coding, storage, and/or network resources (e.g., streaming point cloud data over a network). In examples, point cloud applications may perform live or on-demand streaming of point cloud content, for example, depending on how the content may be generated. Point cloud application may create, process, and/or send or receive large amounts of information representing point clouds. Point cloud applications may support adaptive streaming techniques, for example, to avoid overloading a network and/or to provide optimized viewing experiences, for example, with respect to varying network capacity and/or other operating conditions.

MPEG-DASH may (e.g., may be used to) provide adaptive delivery of point clouds. MPEG-DASH may be implemented, for example, with signaling to support point cloud media, including point cloud streams. Signaling elements may indicate or may enable streaming clients to identify point cloud streams and their component sub-streams within an MPD file. Signaling elements may indicate or may enable streaming clients to identify one or more types of metadata that may be associated with point cloud components, for example, to enable a streaming client to select version(s) (e.g., the best versions) of a point cloud or point cloud components that the streaming client may be configured or configurable to support.

Components of point cloud content may be available at different representations. In examples, multiple representations (e.g., each of multiple representations) may represent a different quality level. A streaming client may utilize guidance (e.g., an indication signaled in an MPD file) about different representations. For example, an indication may indicate which set of representations across the different components constitute a certain quality level (e.g., in order to perform graceful quality degradation). Components of point cloud content may be divided into multiple tiles. Clients may stream a particular tile portion (e.g., a selected tile portion) of geometry components (e.g., instead of streaming all point cloud data), for example, based on bandwidth availability. G-PCC component tile bitstreams may be available at different Adaptation Sets, for example, where an Adaptation Set (e.g., each Adaptation Set) may represent a G-PCC component tile.

G-PCC media content may comprise a number of components, such as geometry and/or attributes. A component (e.g., each component among multiple components) may be encoded separately, for example, as a sub-stream of the G-PCC bitstream. Components, such as geometry and attributes, may be encoded, for example, using a G-PCC encoder. Sub-streams may be collectively decoded (e.g., along with metadata), for example, to render a point cloud.

Elements and/or attributes may be defined, for example, as XML elements and/or XML attributes. XML elements may be defined, for example, in a separate namespace (e.g., "urn:mpeg:mpegI:gpcc:2020"). A namespace designator "gpcc:" may be used herein, for example, to refer to the separate namespace.

G-PCC Components may be signaled in DASH MPD. In examples, a G-PCC component (e.g., each G-PCC component) may be represented in a DASH manifest file (e.g., MPD file) as a separate AdaptationSet, for example, which may be referred to as a Component Adaptation Set. The Adaptation Set comprising the geometry information may be the Main Adaptation Set, for example, which may serve as the access point (e.g., main access point) for the G-PCC content. In examples, an adaptation set (e.g., one adaptation set) may be signaled per component per resolution. In examples, a Main Adaptation Set may comprise the @codecs attribute set to 'gpc1.'

An EssentialProperty descriptor may be used with the @schemeIdUri attribute set equal to "urn:mpeg:mpegI:gpcc:2020:component," for example, to identify the type of the G-PCC component(s) in a Component Adaptation Set. An EssentialProperty descriptor may be referred to, for example, as a GPCCComponent descriptor.

In examples (e.g., at an adaptation set level), a GPCC-Component descriptor (e.g., one GPCCComponent descriptor) may be signaled for a point cloud component (e.g., each point cloud component) that is present in the Representations of the adaptation set.

Table 5 shows an example of elements and attributes for a GPCCComponent descriptor. In examples, the @value attribute of the GPCCComponent descriptor may be absent. The GPCCComponent descriptor may include the attributes defined in Table 5.

eter sets for the Representation and geometry data for the Representation, for example, if more than one Representation is signaled in the Main Adaptation Set. The Representation(s) of other Component Adaptation Sets (e.g., other Component Adaptation Sets of the point cloud) may list the corresponding Representation identifiers from the Main Adaptation Set, for example, using the @dependencyId attribute. The Representations in the Main Adaptation Set may be mapped to the corresponding Representations in the G-PCC components AdaptationSets. Media segments for the Representations of the Main Adaptation Set may include, for example, one or more track fragments of the G-PCC track.

TABLE 5

| Elements and Attributes for GPCCComponent descriptor | Use | Data type | Description |
|---|---|---|---|
| component | 0 . . . N | gpcc:gpccComponentType | An element whose attributes may specify information for one of the point cloud components present in the representation(s) of the adaptation set. |
| component@component_type | | xs:string | Indicates the type of the point cloud component. Value 'geom' indicates a geometry component, and 'attr' indicates an attribute component. |
| component@attribute_type | | xs:unsignedByte | Indicates the type of the attribute. Values may be between 0 and 255, inclusive. May be present, for example, if the component is a point cloud attribute (for example, component type has the value 'attr'). Attribute type & value 0: Colour 1: Reflectance 2: Frame index 3: Material ID 4: Transparency 5: Normals 6 to 255: Reserved |

Table 6 shows an example of an XML schema for a GPCCComponent descriptor corresponding to Table 5.

TABLE 6

```
<?xml version="1.0" encoding="UTF-8"?>
<xs:schema xmlns:xs="http://www.w3.org/2001/XMLSchema"
  targetNamespace="urn:mpeg:mpegI:gpcc:2020"
  xmlns:gpcc="urn:mpeg:mpegI:gpcc:2020"
  elementFormDefault="qualified">
  <xs:element name="component" type="gpcc:gpccComponentType"/>
  <xs:complexType name="gpccComponentType">
    <xs:attribute name="component_type" type="xs:string"
      use="required" />
    <xs:attribute name="attribute_type" type="xs:unsignedByte" />
  </xs:complexType>
</xs:schema>
```

The Main Adaptation Set may include, for example, an Initialization Segment (e.g., a single Initialization Segment) at adaptation set level or multiple initialization segments at representation level (e.g., one initialization segment for each Representation). Initialization segments may include G-PCC parameter sets, which may (e.g., may be used to) initialize the G-PCC decoder. G-PCC parameter sets for one or more Representations (e.g., all Representations) may be included in an initialization segment, for example, if there is an initialization segment (e.g., a single initialization segment).

In examples, an initialization segment for a Representation (e.g., each Representation) may include G-PCC param- Media segments for the Representations of component AdaptationSets may include, for example, one or more track fragments of a corresponding component track (e.g., at the file format level).

In examples, a Role descriptor element may be used with values that may be defined for G-PCC components. For example, one or more geometry components may comprise corresponding value(s) of gpcc-geometry and/or one or more attribute components may comprise corresponding value(s) of gpcc-attribute. An EssentialProperty descriptor element (e.g., similar to an EssentialProperty descriptor element described for the example shown in Table 5) may be signaled at the adaptation set level. In examples, EssentialProperty descriptor element may be signaled excluding the component-type attribute (e.g., at the adaptation set level). The EssentialProperty descriptor element may be signaled, for example, to identify the geometry component(s) and/or the attribute component(s).

In examples, a version (e.g., each version) of multiple versions of a G-PCC component may be signaled in a separate AdaptationSet with the value of the @codecs attribute set according to the media codec used, for example, if multiple versions of a G-PCC component are encoded using a different codec. Switching (e.g., seamless switching) between Representations across the AdaptationSets of multiple versions of a G-PCC component may be supported. Each of the multiple adaptation sets may include a SupplementalProperty descriptor, for example, with @schemeIdURI set to urn:mpeg:dash:adaptation-setswitching:2016 and/or @value including a comma-separated list of AdaptationSet Is corresponding to the other available versions, for example, to indicate that seamless switching between Representations across the AdaptationSets of multiple versions of a G-PCC component is supported. In examples, one or more rules for supporting switching across adaptation sets may be applied.

G-PCC tile tracks may be signaled. When multiple tile tracks are present in the G-PCC container, the Main Adaptation Set may (e.g., may only) comprise the parameter sets and the tile inventory information from the G-PCC base track. Geometry data and/or attribute data may be absent in the Main Adaptation Set and the Main Adaptation Set's Representations. In examples, the @codecs attribute for the Main Adaptation Set may be set to 'gpcb', for example, indicating that the Adaptation Set comprises the base track data which comprises (e.g., comprises only) SPS, GPS, APS, and Tile Inventory information of the G-PCC content.

At the Tile Component Adaptation Set level, a GPCCComponent descriptor may be signaled. In examples, the GPCCComponent descriptor may include an attribute (e.g., an additional attribute) @tile_ids, for example, indicating the list of tiles present in the tile bitstream. The GPCCComponent descriptor may include (e.g., conditionally include) an XML attribute @attr_index, for example, if the component represented by the enclosing Adaptation Set is a G-PCC attribute component. The @attr_index attribute may signal the order of the G-PCC attribute component in the SPS and/or may enable distinguishing G-PCC attribute components, for example, if multiple G-PCC attribute components with the same attribute type (e.g., more than one color attribute) are present in the G-PCC content. The GPCCComponent descriptor present at the Tile Component Adaptation Set level may include elements and/or attributes as defined in Table 7.

TABLE 7

Elements and attributes for the GPCCComponent descriptor

| Elements and Attributes for GPCCComponent descriptor | Use | Data type | Description |
|---|---|---|---|
| component | 0 . . . N | gpcc:gpccComponentType | An element whose attributes specify information for one of the point cloud components present in the representation(s) of the adaptation set |
| component@component_type | | xs:string | Indicates the type of the point cloud component Value 'geom' indicates a geometry component, and 'attr' indicates an attribute component. |
| component@attribute_type | | xs:unsignedByte | Indicates the type of the attribute. Only values between 0 and 255, inclusive, are allowed. May be present if (e.g., only if) the component is a point cloud attribute (i.e., component_type has the value 'attr'). |
| component@attr_index | | xs:unsignedByte | Indicates the order of the attribute present in the SPS. The value of @attr_index may be identical to the ash_attr_sps_attr_idx value of the TLV encapsulation structure containing attribute data unit in the samples of the component track represented by the Component Adaptation Set. May be present if (e.g., only if) the component is a point cloud attribute (i.e., component_type has the value 'attr'). |
| component@tile_ids | | xs:UIntVectorType | A list of space separated identifiers corresponding to the @tile_id attribute value of each G-PCC tile present in this tile bitstream. May be present if (e.g., only if) the content has tile tracks present in the container. The value of @tile_id may be identical to that of the tile_id field for one of the tiles in tile_inventory( ), or identical to the inferred value of the tile id based on the index of the tile in the tile inventory. |

A component tile track (e.g., each component tile track) may be signaled in a separate Adaptation Set. The separate Adaptation Set may be referred to as a Tile Component Adaptation Set. When multiple versions of a component for the same tile (e.g., or the same set of tiles) are present and carried/or in separate tile tracks, each version may be signaled in a Representation of the Tile Component Adaptation Set. The @codecs attribute for Tile Component Adaptation Sets representing component tile tracks for G-PCC media content may be set to 'gptl'.

Table 8 shows an example of an XML schema for a GPCCComponent descriptor corresponding to Table 7.

TABLE 8

Example of an XML schema for a GPCCComponent descriptor

<?xml version="1.0" encoding="UTF-8"?>
<xs:schema xmlns:xs="http://www.w3.org/2001/XMLSchema"
    targetNamespace="urn:mpeg:mpegI:gpcc:2020"

TABLE 8-continued

Example of an XML schema for a GPCCComponent descriptor

```
xmlns:gpcc="urn:mpeg:mpegI:gpcc:2020"
elementFormDefault="qualified">
<xs:element name="component"
type="gpcc:gpccComponentType"/>
<xs:complexType name="gpccComponentType">
    <xs:attribute name="component_type" type="xs:string"
    use="required" />
    <xs:attribute name="attribute_type" type=
    "xs:unsignedByte" />
    <xs:attribute name="attr_index" type="xs:unsignedByte" />
    <xs:attribute name="tile_ids" type="xs:UIntVectorType" />
</xs:complexType>
</xs:schema>
```

In examples, when multiple tile tracks are present in the container, each Representation in the geometry Tile Component Adaptation Set may refer to the corresponding Representation in the Main Adaptation Set for example, using the @dependencyId attribute. Each Representation in an attribute Tile Component Adaptation Set may refer to the corresponding Representation in the geometry Tile Component Adaptation Set, for a example, using the dependencyId attibute.

G-PCC component tile tracks which comprise the same alternate_group value may e signaled in the MPD, for example, as Representations of the Tile Component Adaptation Set.

A G-PCC descriptor may be signaled. A streaming client may (e.g., may be able to or be configured to) identify the type of point cloud component in an AdaptationSet and/or Representation, for example, by checking a GPCCComponent descriptor within a corresponding element A streaming client may distinguish between different geometry point cloud streams present in an MPD file.

A G-PCC descriptor may comprise, for example, a SupplementalProperty element, for example, with a @schemeIdUri attribute equal to "urn:mpeg:mpegI:gpcc:2020:gpc." Table 9 shows an example of attributes for a G-PCC descriptor. In examples, one or more (e.g., at most one) G-PCC descriptors may be present at the adaptation set level for the Main Adaptation Set of the G-PCC media.

TABLE 9

| Attributes for G-PCC descriptor | Use | Data type | Description |
|---|---|---|---|
| gpcc:@gpcId | | xs:string | An ID for the volumetric media. This attribute may be present, |

TABLE 9-continued

| Attributes for G-PCC descriptor | Use | Data type | Description |
|---|---|---|---|
| | | | for example, if multiple versions of the same volumetric media are signaled in separate AdapatationSets. |

Data types for the attributes may be as defined, for example, in an XML schema Table 10 shows an example of an XML schema for a G-PCC descriptor. A schema may be represented, for example, in an XML schema with a namespace urn:mpeg:mpegI:gpcc:2020.

TABLE 10

```
<?xml version="1.0" encoding="UTF-8"?>
<xs:schema xmlns:xs="http://www.w3.org/2001/XMLSchema"
    targetNamespace="urn:mpeg:mpegI:gpcc:2020"
    xmlns:gpcc="urn:mpeg:mpegI:gpcc:2020"
    elementFormDefault="qualified">
    <xs:attribute name="gpcId" type="xs:string" />
</xs:schema>
```

A GPCCTileId descriptor may be signaled. A streaming client may identify a tile id, or tile ids, present in a G-PCC Tile Component AdaptationSet, for example, by checking the GPCCComponent descriptor. In examples, one or more of the components (e.g., all of the components) of a G-PCC tile may be stored in a single track. For example, a GPCC-Component descriptor may not be signaled in the AdapatationSet associated with that track. In examples, a streaming client may distinguish between different G-PCC tile tracks that may be present in the MPD file. For example, a streaming client may distinguish between different G-PCC tile tracks by identifying the respective tile streams.

In examples, a SupplementalProperty element with a @schemeIdUri attribute equal to "urn:mpeg:mpegI:gpcc:2020:tileID" may be (e.g., may be referred to as) a GPCC-TileId descriptor. A GPCCTileId descriptor may be used to distinguish between different G-PCC tile streams. In examples, one (e.g., at most one) GPCCTileId descriptor may be signaled and/or present at the adaptation set level for the G-PCC tile media. The one (e.g., at most one) GPCC-TileId descriptor may be signaled or present at the adaptation set level, for example, if the GPCCComponent descriptor is not available at the adaptation set level (e.g., if all the G-PCC components data of a tile or group of tiles are in one track).

In examples, the @value attribute of the GPCCTileId descriptor may be absent. The GPCCTileId descriptor may include one or more attributes as illustrated in Table 11.

TABLE 11

| Attributes for GPCCTileId descriptor | Use | Data type | Description |
|---|---|---|---|
| gpcc:@tile_Ids | | xs:UIntVectorType | A list of space separated identifiers corresponding to the @tile_id attribute value of each G-PCC tile present in this tile track bitstream.. The value of @tile_id may be identical to that of the tile_id field for one of the tiles in tile_inventory( ), or identical to the inferred value of the tile id based on the index of the tile in the tile inventory. |

The data types for the attributes may be as provided in the XML schema. In examples, an XML schema for the GPCC-TileId descriptor may be as illustrated in the example schema below. The schema may be represented in an XML schema that comprises namespace urn:mpeg:mpegI:gpcc:2020 and may be specified as illustrated in Table 12 below.

TABLE 12

```
<?xml version="1.0" encoding="UTF-8"?>
<xs:schema xmlns:xs="http://www.w3.org/2001/XMLSchema"
    targetNamespace="urn:mpeg:mpegI:gpcc:2020"
    xmlns:gpcc="urn:mpeg:mpegI:gpcc:2020"
    elementFormDefault="qualified">
    <xs:attribute name="tile_Ids" type="xs:UIntVectorType"
        use="required" />
</xs:schema>
```

A G-PCC Preselection may be signaled. A G-PCC preselection may be signaled in the MPD, for example, using a PreSelection element (e.g., as defined in DASH), for example, with an identifier (ID) list for a @preselectionComponents attribute including, for example, an ID of the Main Adaptation Set for the volumetric media and (e.g., followed by) IDs of the AdaptationSets corresponding to the G-PCC components. In examples, the @codecs attribute for the PreSelection may be set to 'gpc1,' which may indicate, for example, that the PreSelection media is a geometry-based point cloud. The PreSelection may be signaled, for example, using a PreSelection element within the Period element and/or using a preselection descriptor at the adaptation set level.

Figure 9:
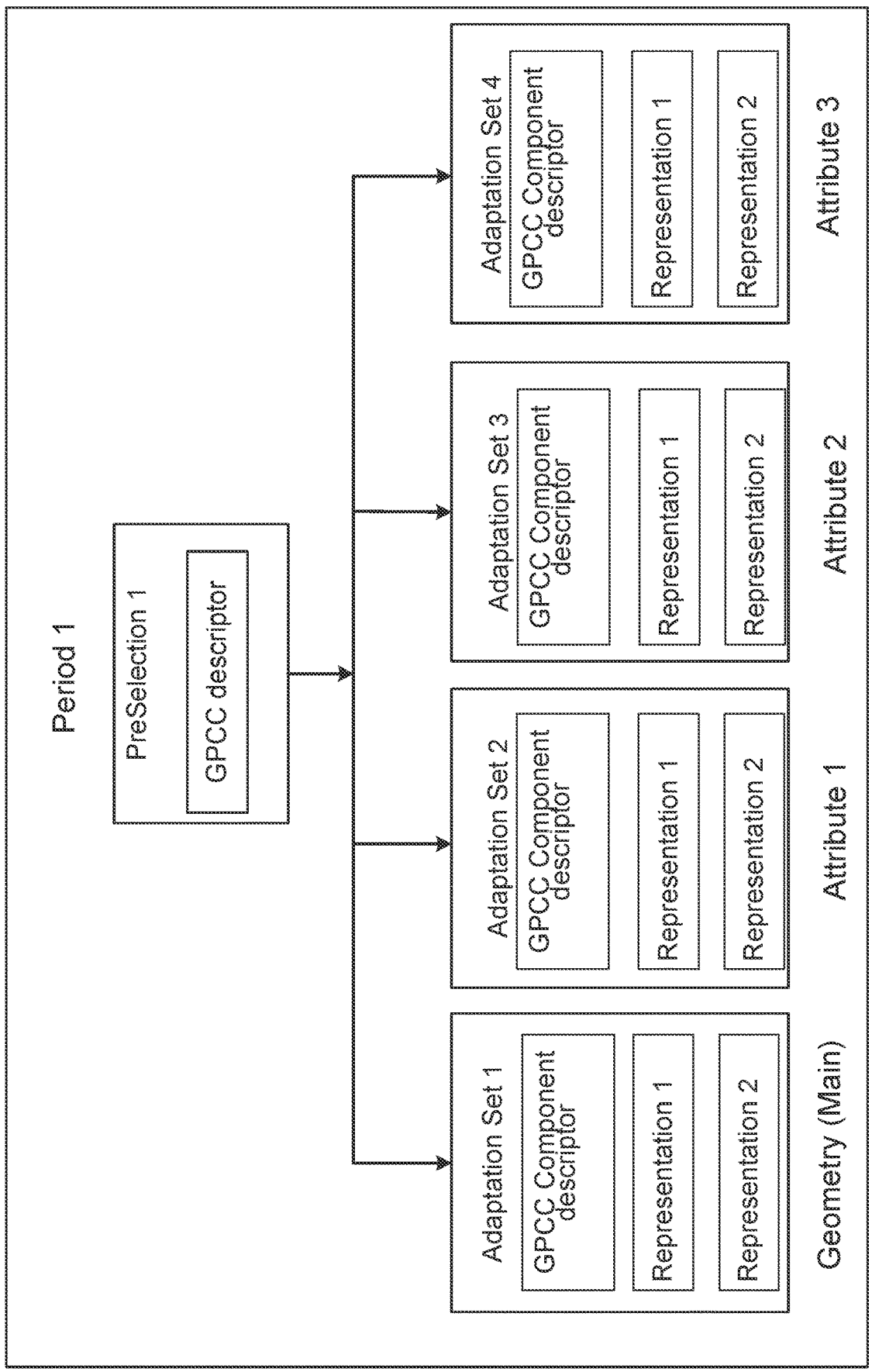
FIG. 9 illustrates an example of grouping G-PCC components in an MPD using preselection.

FIG. 9 illustrates an example of grouping G-PCC components in an MPD using preselection. FIG. 9 illustrates an example DASH configuration for grouping G-PCC components that may belong to a volumetric media (e.g., a single volumetric media) within an MPEG-DASH MPD file.

Multiple versions of G-PCC media may be signaled. In examples, multiple versions of the same point cloud media may be signaled, for example, using separate PreSelections. PreSelections that represent alternative versions of the same geometry-based pointcloud media may include, for example, a G-PCC descriptor with the same @gpcId value. One or more (e.g., at most one) G-PCC descriptors may be present for example, at the preselection level. Preselections may be selectable alternatives. The id list of @preselection Components attribute may comprise the ID of the Main Adaptation Set followed by the remaining components Adaptation Set IDs, for example, if the @codecs attribute is set to 'gpc1'.

Figure 10:
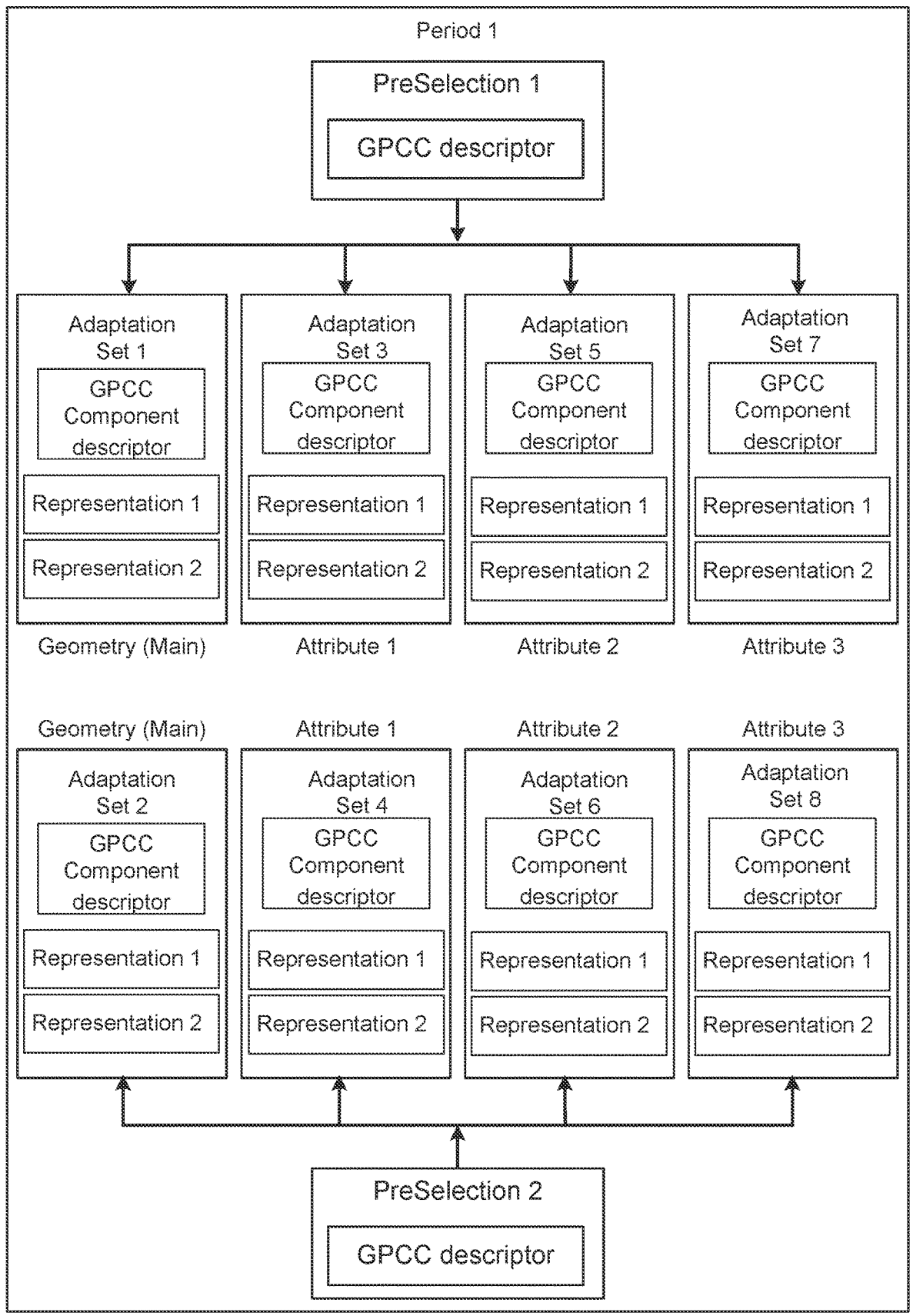
FIG. 10 illustrates an example of grouping multiple versions of G-PCC components in an MPD using preselections.

FIG. 10 illustrates an example of grouping multiple versions of G-PCC components in an MPD using preselections. FIG. 10 illustrates an example of DASH configuration for grouping multiple versions of G-PCC components that may belong to a single point cloud within an MPEG-DASH MPD file. A grouping/association may be signaled, for example, using a preselection descriptor. Table 13 illustrates an example of signaling multiple versions of GPCC components in an MPD using preselections.

TABLE 13

```
<?xml version="1.0" encoding="UTF-8"?>
<MPD
    xmlns="urn:mpeg:dash:schema:mpd:2011"
    xmlns:gpcc="urn:mpeg:mpegI:gpcc:2020"
    type="static"
    mediaPresentationDuration="PT10S"
    minBufferTime="PT1S"
    profiles="urn:mpeg:dash:profile:isoff-on-demand:2011">
<Period>
    <!-- Main GPCC Geometry AdaptationSet -->
    <AdaptationSet id="1" codecs="gpc1">
        <EssentialProperty schemeIdUri="urn:mpeg:dash:preselection:2016" />
        <EssentialProperty schemeIdUri="urn:mpeg:mpegI:gpcc:2020:component">
            <gpcc:component component_type="geom" />
        </EssentialProperty>
        <Representation>
            ...
        </Representation>
    </AdaptationSet>
    <AdaptationSet id="2" codecs="gpc1">
        <EssentialProperty schemeIdUri="urn:mpeg:dash:preselection:2016" />
        <EssentialProperty schemeIdUri="urn:mpeg:mpegI:gpcc:2020:component">
            <gpcc:component component_type="geom" />
        </EssentialProperty>
        <Representation>
            ...
        </Representation>
    </AdaptationSet>
    <!-- Attribute -->
    <AdaptationSet id="3" codecs="gpc1">
        <EssentialProperty schemeIdUri="urn:mpeg:dash:preselection:2016" />
        <EssentialProperty schemeIdUri="urn:mpeg:mpegI:gpcc:2020:component">
            <gpcc:component component_type="attr" attribute_type="0" />
        </EssentialProperty>
        <Representation>
            ...
        </Representation>
    </AdaptationSet>
    <AdaptationSet id="4" codecs="gpc1">
        <EssentialProperty schemeIdUri="urn:mpeg:dash:preselection:2016" />
        <EssentialProperty schemeIdUri="urn:mpeg:mpegI:gpcc:2020:component">
            <gpcc:component component_type="attr" attribute_type="0" />
        </EssentialProperty>
```

TABLE 13-continued

```
                <Representation>
                    ...
                </Representation>
        </AdaptationSet>
        <!-- Attribute -->
        <AdaptationSet id="5" codecs="gpc1">
                <EssentialProperty schemeIdUri="urn:mpeg:dash:preselection:2016" />
                <EssentialProperty schemeIdUri="urn:mpeg:mpegl:gpcc:2020:component">
                    <gpcc:component component_type="attr" attribute_type="1"/>
                </EssentialProperty>
                <Representation>
                    ...
                </Representation>
        </AdaptationSet>
        <AdaptationSet id="6" codecs="gpc1">
                <EssentialProperty schemeIdUri="urn:mpeg:dash:preselection: 2016" />
                <EssentialProperty schemeIdUri="urn:mpeg:mpegl:gpcc:2020:component">
                    <gpcc:component component_type="attr" attribute_type="1"/>
                </EssentialProperty>
                <Representation>
                    ...
                </Representation>
        </AdaptationSet>
        <AdaptationSet id="7" codecs="gpc1">
                <EssentialProperty schemeIdUri="urn:mpeg:dash:preselection:2016" />
                <EssentialProperty schemeIdUri="urn:mpeg:mpegl:gpcc:2020:component">
                    <gpcc:component component_type="attr" attribute_type="4"/>
                </EssentialProperty>
                <Representation>
                    ...
                </Representation>
        </AdaptationSet>
        <AdaptationSet id="8" codecs="gpc1">
                <EssentialProperty schemeIdUri="urn:mpeg:dash:preselection:2016" />
                <EssentialProperty schemeIdUri="urn:mpeg:mpegl:gpcc:2020:component">
                    <gpcc:component component_type="attr" attribute_type="4"/> />
                </EssentialProperty>
                <Representation>
                    ...
                </Representation>
        </AdaptationSet>
        <!-- Preselections -->
        <Preselection id="1" tag="1" preselectionComponents="1 3 5 7" codecs="gpc1">
                <!—GPCC Descriptor -->
                <EssentialProperty schemeIdUri="urn:mpeg:mpegl:gpcc:2020:gpc" gpcId="1" />
        </Preselection>
        <Preselection id="2" tag="2" preselectionComponents="2 4 6 8" codecs="gpc1">
                <!—GPCC Descriptor -->
                <EssentialProperty schemeIdUri="urn:mpeg:mpegl:gpcc:2020:gpc" gpcId="1"/>
        </Preselection>
</Period>
</MPD>
```

In examples, the G-PCC components AdaptationSets of the point cloud, or Representation(s) of the Adaptation Sets, may list the identifiers of the main AdaptationSets and/or Representations using, for example, the @dependencyId attribute. There may be dependency (e.g., an inherent dependency), if, for example, segments in the Main Adaptation Set are decoded in conjunction with segments from the AdaptationSets of the paint cloud components to reconstruct the point cloud.

In examples, G-PCC Tile Preselections may be implemented. When the G-PCC content is carried using multiple tile tracks, the Main Adaptation Set may signal the G-PCC base track data. Tile Component Adaptation Sets may signal the G-PCC geometry and/or attribute tile tracks data.

A G-PCC Tile Preselection may be signaled in the MPD using a PreSelection element as described herein. In an example, the @codecs attribute of the Preselection may be set to 'gpt1', for example, indicating that the Preselection media is a set of geometry-based point cloud tiles. The Preselection may be signaled using a PreSelection element within a Period element, as described herein. The Preselection may be signaled using a Preselection descriptor at the Tile Component Adaptation Set level.

A PreSelection element may comprise an ID list for the @preselectionComponents attribute. The @preselectionComponents attribute ID list for a G-PCC Tile Preselection may comprise the ID of a geometry Tile Component Adaptation Set followed by the corresponding attribute Tile Component Adaptation Set ID(s). The Representation of the Main Adaptation Set corresponding to the selected geometry Tile Component Adaptation Sets Representation may be identified, for example, using @dependencyId attribute signaled in the Representation(s) of the Adaptation Set.

A G-PCC Tile Preselection (e.g., each G-PCC Tile Preselection) may comprise one or more GPCCTileId descriptor(s). This may allow the identification of the tiles referenced in each Preselection. When the GPCCTileId descriptor is absent, the tiles belonging to a G-PCC Tile Preselection may be identified by finding the geometry Tile Component Adaptation Set from the ID list of @preselectionComponents attribute and checking the list of tile IDs from the GPCCComponent descriptor present in the geometry Tile Component Adaptation Set.

Figure 11:
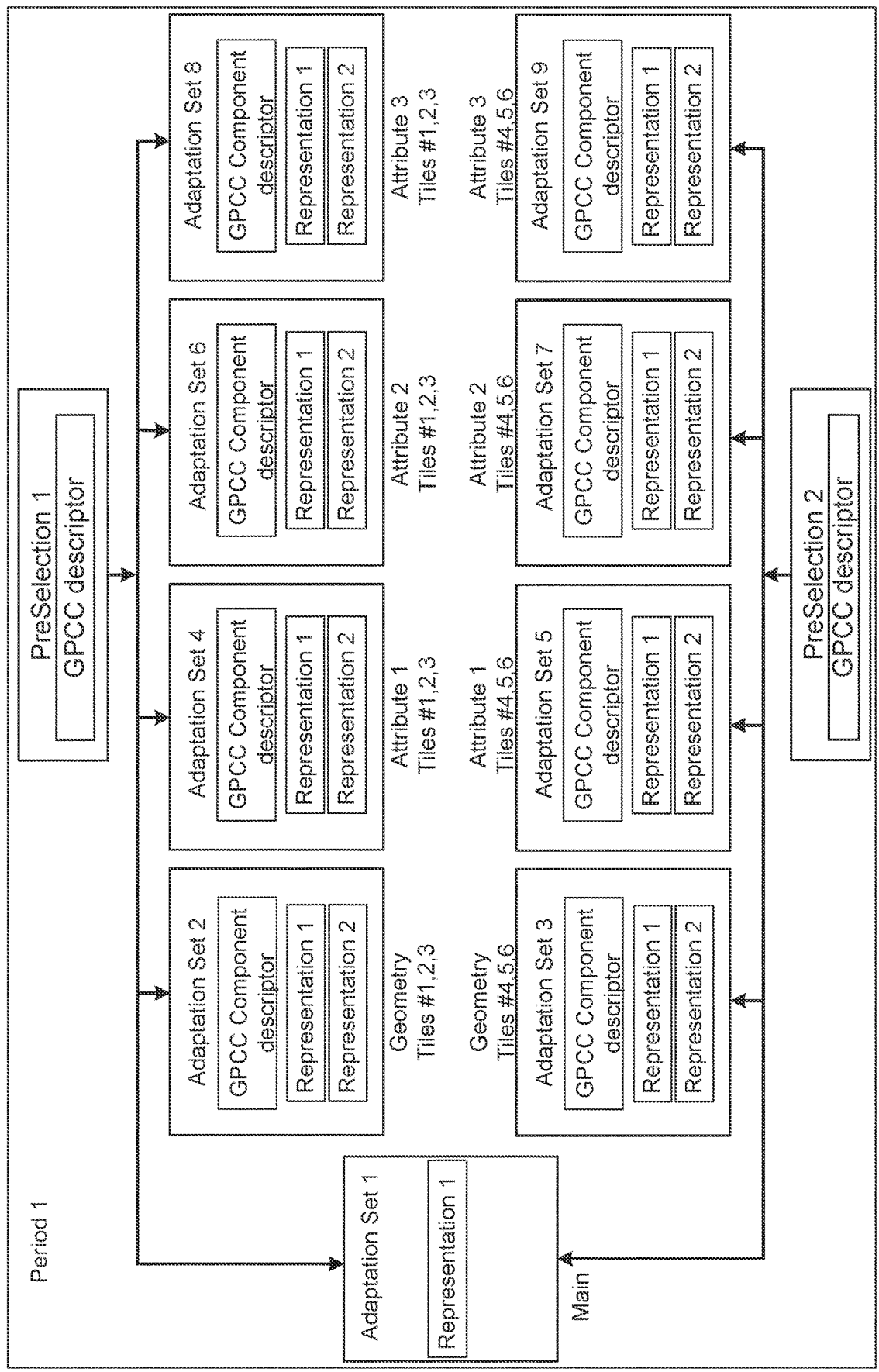
FIG. 11 illustrates an example of G-PCC content with multiple tile tracks.

FIG. 11 illustrates an example of G-PCC content with multiple tile tracks. FIG. 11 may be an exemplary DASH configuration. The G-PCC content may comprise a geometry component and one or more attribute components (e.g., three attribute components). In the example, the G-PCC bitstream comprises 6 tiles that are grouped into two tile sets. The first tile set includes tiles 1, 2, and 3 and the second tile set includes tiles 4, 5, and 6. The components of each tile set may be available in two different versions (e.g., encoded at different qualities). A component version (e.g., each component version) for a tile set may be carried in a separate G-PCC tile track in the ISOBMFF container file. The MPD file may include a Tile Component Adaptation Set for each component of the two tile sets. A Tile Component Adaptation Set (e.g., each Tile Component Adaptation Set) may include two representations (e.g., one for each version of the component). Two Preselections may be used in the MPD to signal the two tile sets present in the G-PCC bitstream.

Table 14 illustrates an example of a DASH MPD file signaling a G-PCC content with multiple tile tracks along with the Preselection descriptor.

TABLE 14

```
<?xml version="1.0" encoding="UTF-8"?>
<MPD
    xmlns="urn:mpeg:dash:schema:mpd:2011"
    xmlns:gpcc="urn:mpeg:mpegI:gpcc:2020"
    type="static"
    mediaPresentationDuration="PT10S"
    minBufferTime="PT1S"
    profiles="urn:mpeg:dash:profile:isoff-on-demand:2011">
<Period>
    <!-- Main GPCC AdaptationSet -->
    <AdaptationSet id="1" codecs="gpcb">
        <EssentialProperty schemeIdUri="urn:mpeg:dash:preselection:2016" />
        <Representation id="1">
            ...
        </Representation>
    </AdaptationSet>
    <!-- GPCC Geometry Tile Component AdaptationSet -->
    <AdaptationSet id="2" codecs="gpt1">
        <EssentialProperty schemeIdUri="urn:mpeg:dash:preselection:2016" />
        <EssentialProperty schemeIdUri="urn:mpeg:mpegI:gpcc:2020:component">
           <gpcc:component component_type="geom" tile_ids="1 2 3"/>
        </EssentialProperty>
        <Representation id="3" dependencyId="1">
            ...
        </Representation>
      <Representation id="4" dependencyId="1">
            ...
        </Representation>
    </AdaptationSet>
    <!-- GPCC Geometry Tile Component AdaptationSet -->
    <AdaptationSet id="3" codecs="gpt1">
        <EssentialProperty schemeIdUri="urn:mpeg:dash:preselection:2016" />
      <EssentialProperty schemeIdUri="urn:mpeg:mpegI:gpcc:2020:component">
           <gpcc:component component_type="geom" tile_ids="4 5 6"/>
        </EssentialProperty>
        <Representation id="5" dependencyId="1">
            ...
        </Representation>
        </Representation>
      <Representation id="6" dependencyId="1">
    </AdaptationSet>
    <!--Attribute Tile Component AdaptationSets -->
    <AdaptationSet id="4" codecs="gpt1">
        <EssentialProperty schemeIdUri="urn:mpeg:dash:preselection:2016" />
        <EssentialProperty schemeIdUri="urn:mpeg:mpegI:gpcc:2020:component">
           <gpcc:component component_type="attr" attribute_type="0" attr_index="0" tile ids="1 2 3"/>
        </EssentialProperty>
        <Representation id="7" dependencyId="3">
            ...
        </Representation>
        <Representation id="8" dependencyId="4">
            ...
        </Representation>
    </AdaptationSet>
    <AdaptationSet id="5" codecs="gpt1">
        <EssentialProperty schemeIdUri="urn:mpeg:dash:preselection:2016" />
        <EssentialProperty schemeIdUri="urn:mpeg:mpegI:gpcc:2020:component">
           <gpcc:component component_type="attr" attribute_type="0" attr_index="0" tile_ids="4 5 6"/>
        </EssentialProperty>
        <Representation id="9" dependencyId="5">
            ...
        </Representation>
        <Representation id="10" dependencyId="6">
            ...
        </Representation>
    </AdaptationSet>
```

TABLE 14-continued

```
<!-- Attribute -->
<AdaptationSet id="6" codecs="gpt1">
    <EssentialProperty schemeIdUri="urn:mpeg:dash:preselection:2016" />
    <EssentialProperty schemeIdUri="urn:mpeg:mpegl:gpcc:2020:component">
        <gpcc:component component_type="attr" attribute_type="1" attr_index="1" tile_ids="1 2 3"/>
    </EssentialProperty>
    <Representation id="11" dependencyId="3">
        ...
    </Representation>
    <Representation id="12" dependencyId="4">
        ...
    </Representation>
</AdaptationSet>
<AdaptationSet id="7" codecs="gpt1">
    <EssentialProperty schemeIdUri="urn:mpeg:dash:preselection:2016" />
    <EssentialProperty schemeIdUri="urn:mpeg:mpegl:gpcc:2020:component">
        <gpcc:component component_type="attr" attribute_type="1" attr_index="1" tile_ids="4 5 6"/>
    </EssentialProperty>
    <Representation id="13" dependencyId="5">
        ...
    </Representation>
    <Representation id="14" dependencyId="6">
        ...
    </Representation>
</AdaptationSet>
<!-- Attribute -->
<AdaptationSet id="8" codecs="gpt1">
    <EssentialProperty schemeIdUri="urn:mpeg:dash:preselection:2016" />
    <EssentialProperty schemeIdUri="urn:mpeg:mpegl:gpcc:2020:component">
        <gpcc:component component_type="attr" attribute_type="4" attr_index="2" tile_ids ="1 2 3"/>
    </EssentialProperty>
    <Representation id="15" dependencyId="3">
        ...
    </Representation>
    <Representation id="16" dependencyId="4">
        ...
    </Representation>
</AdaptationSet>
<AdaptationSet id="9" codecs="gpt1">
    <EssentialProperty schemeIdUri="urn:mpeg:dash:preselection:2016" />
    <EssentialProperty schemeIdUri="urn:mpeg:mpegl:gpcc:2020:component">
        <gpcc:component component_type="attr" attribute_type="4" attr_index="2" tile_ids="4 5 6"/>
    </EssentialProperty>
    <Representation id="17" dependencyId="5">
        ...
    </Representation>
    <Representation id="18" dependencyId="6">
        ...
    </Representation>
</AdaptationSet>
<!--Tile Preselections -->
<Preselection id="1" tag="1" preselectionComponents="2 4 6 8" codecs="gpt1">
    <!--GPCCTileId Descriptor -->
    <EssentialProperty schemeIdUri="urn:mpeg:mpegl:gpcc:2020:tileID" tile_ids="1 2 3"/>
</Preselection>
<Preselection id="2" tag="2" preselectionComponents="3 5 7 9" codecs="gpt1">
    <!--GPCCTileId Descriptor -->
    <EssentialProperty schemeIdUri="urn:mpeg:mpegl:gpcc:2020:tileID" tile_ids="4 5 6"/>
</Preselection>
</Period>
</MPD>
```

In examples, media data may be signaled using separate PreSelections, for example, if multiple point clouds media is available. PreSelections that represent geometry-based point cloud media data may include a G-PCC descriptor with a unique @gpcId value. One or more (e.g., at most one) G-PCC descriptor may be present, for example, at the preselection level. The ID of the main adaptation set, ID (e.g., first ID) in the list of adaptation set IDs for the @preselectionComponents attribute, and/or (e.g., followed by) the IDs of the AdaptationSets corresponding to the point cloud components may be present. The point cloud may be identified, for example, using a unique value of @gpcId attribute, for example, as may be defined in the G-PCC descriptor.

G-PCC tile groups may be signaled. In examples, the tiles bounding box information may be signaled (e.g., using GPCCTileInventoxy descriptor), for example, if multiple tiles in a geometry-based point cloud are present A GPCC-TileInventory descriptor may be a SupplementalProperty element, for example, with a @schemeIdUri attribute (e.g., set to "urn:mpeg:mpegl:gpcc:2020:gptl.") A GPCCTileInventory descriptor may be present at the adaptation set level for the Main Adaptation Set of the G-PPCC media, for example, if the G-PCC media is tiled. Table 15 shows an example of elements and attributes for a GPCCTileInventory descriptor.

TABLE 15

| Elements and Attributes for GRCCTileInventory descriptor | Use | Data type | Description |
|---|---|---|---|
| gptl | 0 . . . 1 | gpcc:tileInventory | Container element whose attributes and elements specify the information of GPCC tiles. |
| gptl.tile | 1 . . . N | gpcc:tileInfo | An element whose attributes define a file and provide the information of the G-PCC tiles. |
| gptl.tile@tile_id | | xs:string | Indicates the unique ID of the gpcc tile. The value of @tile_id may be identical to the value of the tile_id field for one of the tiles in tile_inventory( ), or identical to the inferred value of the file ID, for example, based on the index of the tile in the tile inventory. |
| gptl.tile@x_offset | | xs:int | The x offset of the tile bounding box. May be the same as tile_bounding_box_offset_x in tile_inventory. |
| gptl.tile@y_offset | | xs:int | The y offset of the tile bounding box. May be the same as tile_bounding_box_offset_x in tile_inventory. |
| gptl.tile@z_offset | | xs:int | The z offset of the tile bounding box. May be the same as tile_bounding_box_offset_y in tile_inventory |
| gptl.tile@width | | xs:int | Width of the tile bounding box. May be the same as tile_bouding_box_size_width in tile_inventory |
| gptl.tile@height | | xs:int | Height of the tile bounding box. May be the same as tile_bouding_box_size_height in tile_inventory |
| gptl.tile@depth | | xs:int | Depth of the tile bounding box. May be the same as tile_bouding_box_size_depth in tile_inventory |
| gptl.tile@asIds | | xs:UIntVectorType | A list of space separated identifiers corresponding to the values of the @id attribute for Component Adaptation Sets associated with the tile(s). |

Table 16 illustrates an example of an XML schema for the GPCCTileInventory descriptor. Data types for the various elements and attributes for the GPCCTileInventory descriptor may be defined, for example, in accordance with an XML schema, such as the example schema shown in Table 16.

TABLE 16

```
<?xml version="1.0" encoding="UTF-8"?>
<xs:schema xmlns:xs="http://www.w3.org/2001/XMLSchema"
    targetNamespace="urn:mpeg:mpegI:gpcc:2020"
    xmlns:gpcc="urn:mpeg:mpegI:gpcc:2020"
    elementFormDefault="qualified">
    <xs:element name="gptI" type="gpcc:tileInventory" />
    <xs:complexType name=" tileInventory">
        <xs:element name="tileInfo" type="gpcc:tileinfo"
            minOccurs="1"/>
    </xs:complexType>
    <xs:complexType name="tileInfo">
        <xs:attribute name="tile_id" type="xs:string" use=
        "required" />
        <xs:attribute name="x_offset" type="xs:int" use=
        "required" />
        <xs:attribute name="y_offset" type="xs:int" use=
        "required" />
        <xs:attribute name="z_offset" type="xs:int" use=
        "required" />
        <xs:attribute name="width" type="xs:int" use=
        "required" />
        <xs:attribute name="height" type="xs:int" use=
```

TABLE 16-continued

```
        "required" />
        <xs:attribute name="depth" type="xs:int" use=
        "required" />
        <xs:attribute name="asIds" type=" xs:UIntVectorType"/>
    </xs:complexType>
</xs:schema>
```

A client may select (e.g., first select) a tile ID from the tile inventory bounding box information present in the MPD, for example, if the client is about to stream tiled G-PCC components data from the server. In examples, G-PCC components with the selected tile_id may be streamed to the client.

Dynamic G-PCC Tile Inventory information may be signaled. In case the parameter set data and/or the tile inventory information are dynamically changing, information about such changes may be carried in the samples of the G-PCC base track. In examples, when multiple tiles in a geometry-based point cloud are present and the tiles' bounding box information is dynamically changing, the tiles bounding box information (e.g., along with the parameter sets data) may be carried in the Media Segments of the Representations of the Main Adaptation Set.

Spatial regions may be static. Characteristics of spatial regions and/or mappings between the regions and G-PCC tiles may be signaled (e.g., using a GPCC3DRegions descriptor), for example, if the 3D spatial regions are static. 3D spatial regions may be static, for example, if the position and dimensions of a region (e.g., each region) do not change over the presentation time. A GPCC3DRegions descriptor may be a SupplementalProperty element, for example, with a @schemeIdUri attribute equal to "urn:mpeg:mpegI:gpcc:2020:gpsr." A GPCC3DRegions descriptor (e.g., single GPCC3DRegions descriptor) may be present, for example, at the adaptation set level and/or the representation level in the main G-PCC track, or at the preselection level for the geometry based volumetric media content.

The @value attribute of the GPCC3DRegions descriptor may be absent. The GPCC3DRegions descriptor may include elements and/or attributes (e.g., as specified in Table 17). Table 17 shows an example of elements and attributes associated with a GPCC3DRegions descriptor.

TABLE 17

| Elements and attributes for GPCC3DRegions descriptor | Use | Data type | Description |
| --- | --- | --- | --- |
| gpsr | 0 . . . 1 | gpcc:spatialRegionMapType | Container element whose attributes and elements specify a mapping between a 3D spatial region and GPCC tiles. |
| gpsr.spatialRegion | 1 . . . N | gpcc:spatialRegionType | An element whose attributes define a 3D spatial region and provide a mapping between the defined region and a number of GPCC tiles. |
| gpsr.spatialRegion@id | | xs:unsignedShort | An identifier for the 3D spatial region. The value of this attribute may match the value of the 3d_regionjd field signaled for the corresponding region in the ISOBMFF container. |
| gspr.spatialRegion@type | | xs:unsignedByte | An attribute whose value indicates the type of the spatial region. Value 0 may indicate a cuboid region. The remaining values may be reserved. If not present, the default value may be 0. |
| gpsr.spatialRegion@x | | xs:int | The x-coordinate of the reference point for the bounding box defining the spatial region. |
| gpsr.spatialRegion@y | | xs:int | The y-coordinate of the reference point for the bounding box defining the spatial region. |
| gpsr.spatialRegion@z | | xs:int | The z-coordinate of the reference point for the bounding box defining the spatial region. |
| gpsr.spatialRegion.cuboid | | gpcc:spatialRegionCuboidType | An element specifying a cuboid extending from the reference point of the spatial region. This element may be present, for example, if the spatialRegion@type attribute is set to 0. |
| gpsr.spatialRegion.cuboid@dx | | xs:int | The length of the bounding box along the x-axis (e.g., width). Negative values may indicate a length that extends in the negative direction of the axis. |
| gpsr.spatialRegion.cuboid@dy | | xs:int | The length of the bounding box along the y-axis (e.g., height). Negative values may indicate a length that extends in the negative direction of the axis. |
| gpsr.spatialRegion.cuboid@dz | | xs:int | The length of the bounding box along the z-axis (e.g., depth). Negative values may indicate a length that extends in the negative direction of the axis. |
| gspr.spatialRegion@tileIds | | xs:UIntVectorType | A list of space separated identifiers corresponding to the @tile_id attribute value of a (for example, each) G-PCC tile in a tile inventory descriptor. This attribute may be absent, for example, if GROG components are stored as a single-track. |

Data types for various elements and attributes for a GPCC3DRegions descriptor may be defined by a schema, such as the XML schema shown in Table 18. Table 18 shows an example of XML schema for a GPCC3DRegions descriptor.

TABLE 18

```
<?xml version="1.0" encoding="UTF-8"?>
<xs:schema xmlns:xs="http://www.w3.org/2001/XMLSchema"
    targetNamespace="urn:mpeg:mpegl:gpcc:2020"
    xmlns:gpcc="urn:mpeg:mpegl:gpcc:2020"
    elementFormDefault="qualified">
  <xs:element name="gpsr" type="gpcc:spatialRegionMapType" />
  <xs:complexType name="spatialRegionMapType">
    <xs:element name="spatialRegion" type=
    "gpcc:spatialRegionType" minOccurs="1"/>
  </xs:complexType>
  <xs:complexType name="spatialRegionType">
    <xs:attribute name="id" type="xs:unsignedShort"
    use="required" />
    <xs:attribute name="type" type="xs:unsignedByte"
    use="optional" default="0" />
    <xs:attribute name="x" type="xs:int" use="required" />
    <xs:attribute name="y" type="xs:int" use="required" />
    <xs:attribute name="z" type="xs:int" use="required" />
    <xs:attribute name="tileIds" type="xs:UIntVectorType " />
    <xs:element name="cuboid" type=
    "gpcc:spatialRegionCuboidType" minOccurs="0"
    maxOccurs="1"/>
```

TABLE 18-continued

```
  </xs:complexType>
  <xs:complexType name="spatialRegionCuboidType">
    <xs:attribute name="dx" type="xs:int" use="required" />
    <xs:attribute name="dy" type="xs:int" use="required" />
    <xs:attribute name="dz" type="xs:int" use="required" />
  </xs:complexType>
</xs:schema>
```

In examples, the characteristics of spatial regions and/or mappings between the spatial regions and the corresponding AdaptationSets of the G-PCC components may be signaled (e.g., using a GPCC3DRegions descriptor), for example, if the 3D spatial regions are static and tile inventory information is not available. The GPCC3DRegions descriptor may be a SupplementalProperty element, for example, with a @schemeIdUri attribute equal to "urn:mpeg:mpegl:gpcc:2020:gpsr." A GPCC3DRegions descriptor (e.g., single GPCC3DRegions descriptor) may be present, for example, at the adaptation set level and/or the representation level in the main G-PCC track, or at the preselection level for the geometry based volumetric media content.

The @value attribute of the GPCC3DRegions descriptor may be absent. The GPCC3DRegions descriptor may include elements and attributes (e.g., as specified in Table 19). Table 19 shows an example of elements and attributes for a GPCC3DRegions descriptor.

TABLE 19

| Elements and attributes for GPCC3DRegions descriptor | Use | Data type | Description |
|---|---|---|---|
| gpsr | 0 . . . 1 | gpcc:spatialRegionMapType | Container element whose attributes and elements specify a mapping between a 3D spatial region and GPCC tiles. |
| gpsr.spatialRegion | 1 . . . N | gpcc:spatialRegionType | An element whose attributes define a 3D spatial region and provide a mapping between the defined region and a number of GPCC tiles. |
| gpsr.spatialRegion@id | | xs:unsignedShort | An identifier for the 3D spatial region. The value of this attribute may match the value of the 3d_region_id field signaled for the corresponding region in the ISOBMFF container. |
| gspr.spatialRegion@type | | xs:unsignedByte | An attribute whose value indicates the type of the spatial region. Value 0 may indicate a cuboid region. The remaining values may be reserved. If not present, the default value may be 0. |
| gpsr.spatialRegion@x | | xs:int | The x-coordinate of the reference point for the bounding box defining the spatial region. |
| gpsr.spatialRegion@y | | xs:int | The y-coordinate of the reference point for the bounding box defining the spatial region. |
| gpsr.spatialRegion@z | | xs:int | The z-coordinate of the reference point for the bounding box defining the spatial region. |
| gpsr.spatialRegion.cuboid | | gpcc:spatialRegionCuboidType | An element specifying a cuboid extending from the reference point of the spatial region. This element may be present, for example, if the spatialRegion@type attribute is set to 0. |
| gpsr.spatialRegion.cuboid@dx | | xs:int | The length of the bounding box along the x-axis (e.g., width). Negative values indicate a length that extends in the negative direction of the axis. |
| gpsr.spatialRegion.cuboid@dy | | xs:int | The length of the bounding box along the y-axis (e.g., height). Negative values indicate a length that extends in the negative direction of the axis. |

TABLE 19-continued

| Elements and attributes for GPCC3DRegions descriptor | Use | Data type | Description |
|---|---|---|---|
| gpsr.spatialRegion.cuboid@dz | | xs:int | The length of the bounding box along the z-axis (e.g., depth). Negative values indicate a length that extends in the negative direction of the axis. |
| gpsr.spatialRegion@asIds | | xs:UIntVectorType | A list of space separated identifiers corresponding to the values of the @id attribute for AdaptationSets and/or Representations mapped to this region. This attribute may be absent, for example, if there is single-track encapsulation of the GPCC content. |

Data types for the various elements and attributes for the GPCC3DRegions descriptor may be defined, for example, according to a schema, such as an XML schema. Table 20 shows an example of an XML schema for the GPCC3DRegions descriptor.

TABLE 20

```
<?xml version="1.0" encoding="UTF-8"?>
<xs:schema xmlns:xs="http://www.w3.org/2001/XMLSchema"
        targetNamespace="urn:mpeg:mpegl:gpcc:2020"
        xmlns:gpcc="urn:mpeg:mpegl:gpcc:2020"
        elementFormDefault="qualified">
    <xs:element name="gpsr" type="gpcc:spatialRegionMapType" />
    <xs:complexType name="spatialRegionMapType">
        <xs:element name="spatialRegion" type=
        "gpcc:spatialRegionType" minOccurs="1"/>
    </xs:complexType>
    <xs:complexType name="spatialRegionType">
        <xs:attribute name="id" type="xs:unsignedShort" use=
        "required" />
        <xs:attribute name="type" type="xs:unsignedByte" use=
        "optional" default="0" />
        <xs:attribute name="x" type="xs:int" use="required" />
        <xs:attribute name="y" type="xs:int" use="required" />
        <xs:attribute name="z" type="xs:int" use="required" />
        <xs:attribute name="asIds" type="xs:UIntVectorType " />
        <xs:element name="cuboid" type=
```

TABLE 20-continued

```
        "gpcc:spatialRegionCuboidType" minOccurs="0"
        maxOccurs="1"/>
    </xs:complexType>
    <xs:complexType name="spatialRegionCuboidType">
        <xs:attribute name="dx" type="xs:int" use="required" />
        <xs:attribute name="dy" type="xs:int" use="required" />
        <xs:attribute name="dz" type="xs:int" use="required" />
    </xs:complexType>
</xs:schema>
```

In examples, mapping between the spatial region and the corresponding AdaptationSets of the G-PPCC components may be signaled using a GPCC3DRegionID descriptor, for example, if the 3D spatial regions are static. The descriptor may be a SupplementalProperty element with a @schemeIdUri attribute equal to "urn:mpeg:mpegl:gpcc:2020:gp3rid". A single GPCC3DRegionID descriptor may be present at the adaptation set level of a G-PCC component (e.g., each G-PCC component). The GPCC3DRegionID may be absent, for example, if gpsr.spatialRegion@asIds attribute is present in GPCC3DRegions descriptor.

The @value attribute of the GPCC3DRegionID descriptor may be absent. The GPCC3DRegionID descriptor may include one or more attributes as shown in Table 21.

TABLE 21

| Attributes for GPCC3DRegionId descriptor | Use | Data type | Description |
|---|---|---|---|
| gpcc:@region_Id | | xs:unsignedShort | An identifier for the 3D spatial region. The value of this attribute may match the value of the 3d_region_id field signaled for the corresponding region in the ISOBMFF container. |

The datatypes for the attributes may be as approved in the XML schema. An XML schema for the GPCC3DRegionID descriptor is shown below. The schema may be represented in an XML schema that comprises namespace urn:mpeg:mpegI:gpcc:2020 and is specified in Table 22.

TABLE 22

```
<?xml version="1.0" encoding="UTF-8"?>
<xs:schema xmlns:xs="http://www.w3.org/2001/XMLSchema"
    targetNamespace="urn:mpeg:mpegI:gpcc:2020"
    xmlns:gpcc="urn:mpeg:mpegI:gpcc:2020"
    elementFormDefault="qualified">
    <xs:attribute name="region_Id" type="xs: unsignedShort" use=
```

TABLE 22-continued

```
    "required" />
</xs:schema>
```

In examples, the mapping between the spatial region and the corresponding AdaptationSets of the G-PCC components may be signaled using GPCCComponents descriptor, for example, if the 3D spatial region(s) are static. The GPCCComponent descriptor may include elements and attributes as defined in Table 23. GPCC3DRegionID descriptor may be absent, for example, if the @region_Id attribute is present in the GPCCComponents descriptor.

TABLE 23

| Elements and Attributes for GPCCComponent descriptor | Use | Data type | Description |
| --- | --- | --- | --- |
| component | 0 . . . N | gpcc:gpccComponentType | Attributes of this element may specify information for one of the point cloud components present in the representation(s) of the adaptation set. |
| component@component_type | | xs:string | indicates the type of the point cloud component. Value 'geom' Indicates a geometry component, and 'attr' indicates an attribute component. |
| component@attribute_type | | xs:unsignedByte | Indicates the type of the attribute. Only values between 0 and 255, inclusive, may be allowed. May be present if (e.g., only if) the component is a point cloud attribute (i.e., component_type has the value 'attr'). |
| component@tile_id | | xs:UIntVectorType | A list of space separated identifiers corresponding to the @tile_id attribute value of each G-PCC tile present in this tile bitstream. May (e.g., may only) be present if the content has tile tracks. The value of @tile_id may be identical to that of the tile_id field for one of the tiles in tile_inventory( ), or identical to the inferred value of the tile id based on the index of the tile in the tile inventory. |
| component@region_Id | | xs:unsignedShort | An identifier for the 3D spatial region. The value of this attribute may match the value of the 3d_region_id field signaled for the corresponding region in the ISOBMFF container. |

An example on an XML schema for GPCCComponent descriptor is an illustrated in Table 24 below.

TABLE 24

```
<?xml version="1.0" encoding="UTF-8"?>
<xs:schema xmlns:xs="http://www.w3.org/2001/XMLSchema"
    targetNamespace="urn:mpeg:mpegI:gpcc:2020"
    xmlns:gpcc="urn:mpeg:mpegI:gpcc:2020"
    elementFormDefault="qualified">
  <xs:element name="component" type="gpcc:gpccComponentType"/>
  <xs:complexType name="gpccComponentType">
    <xs:attribute name="component_type" type="xs:string" use=
    "required" />
    <xs:attribute name="attribute_type" type="xs:unsignedByte" />
      <xs:attribute name="tile_ids" type="xs:UIntVectorType" />
    <xs:attribute name="region_id" type="xs:unsignedShort" />
  </xs:complexType>
```

In an example, one or more spatial regions may be dynamic. In case of 3D partitions that may be dynamic, a timed-metadata track for signaling the position and/or dimensions of 3D region (e.g., each 3D region) on the presentation timeline may be carried in a separate AdaptationSet with a single representation. The timed-metadata track may be associated (e.g., linked) with the main G-PCC adaptation set(s). The attributes used may include @associationId attribute and an @associationType value that includes the 4CC 'gpdr' for the corresponding AdaptationSet or Representation.

Streaming client behavior may be based on signaling, for example, signaling of one or more descriptors. A DASH client may be guided, for example, by information provided in an MPD. The following is an example of client behavior for streaming geometry-based point cloud compression content, for example, using signaling examples disclosed herein. The example client behavior may assume, for example, that an association of component AdaptationSets to the main point cloud AdaptationSet is signaled using a G-PCC descriptor.

A streaming client may issue (e.g., first issue) an HTTP request, for example, with destination set to a content server. The streaming client may download an MPD file from the content server. The client may parse the MPD file, for example, to generate a corresponding in-memory representation of the XML elements in the MPD file.

The streaming client may check for PreSelection elements at the period level (e.g., with @codecs attribute set to 'gpc1' or 'gpt1', for example, to identify available G-PCC media content in a Period.

AdaptationSets (e.g., all AdaptationSets) belonging to the point cloud content represented by the PreSelection element may be identified, for example, by checking the ID list in the @preselectionComponents attribute of the PreSelection. The Main Adaptation Set may comprise an @id value equal to that of the first ID in the list.

The streaming client may identify the number of unique point clouds, for example, by checking the G-PCC descriptors of the AdaptationSets and/or groups AdaptationSets with the same @gpcId value in their G-PCC descriptor as versions of the same content.

The streaming client (e.g., by checking the GPCCComponent descriptors of the remaining AdaptationSets referenced in the ID list of the @preselectionComponent attribute) may identify the components of the point cloud and may map a component (e.g., each component) to its corresponding AdaptationSet. In examples, more than one point cloud components may be present in an AdaptationSet.

The group of AdaptationSets with @gpcId value present in the G-PCC descriptor corresponding to the desired content may be selected from the ID list of the @preselectionComponent attribute, for example, based on the point cloud content that a user may be interested in streaming. The streaming client may select the AdaptationSets group with a supported version (e.g., a supported resolution), for example, if multiple PreSelection descriptors are present with the same @gpcId value. The sole AdaptationSets group may be chosen, for example, if there are not multiple PreSelection descriptors present with the same @gpcId value.

The client may start streaming the point cloud, for example, by downloading the initialization segment for the Main Adaptation Set that comprises the parameter sets for initializing the G-PCC decoder. Initialization segments for the coded component streams may be downloaded and/or cached in memory.

The streaming client may start downloading time-aligned media segments from the Main Adaptation Set and/or component Adaptation Sets (e.g., in parallel over HTTP). In examples, the downloaded segments may be stored in an in-memory segment buffer. Time-aligned media segments may be removed from their respective buffers and/or concatenated with their respective initialization segments.

The media container (e.g., ISO base media file format (ISOBMFF)) may be parsed, for example, to extract the elementary stream information and structure the G-PCC bitstream and the bitstream may be passed to a G-PCC decoder.

Client behavior for streaming G-PCC media with multiple tiles may be implemented, for example, using the MPD signaling, as described herein. A client (e.g., a streaming client) may issue an HTTP request and/or download the MPD file from a content server. The client may parse the MPD file to generate a corresponding in-memory representation of the XML elements in the MPD file.

The client may check for the AdaptationSet elements with the @codecs attribute set to 'gpcb' and may check for the PreSelection elements with @codecs attribute set to 'gpt1' at the period level, for example, to identify available G-PCC tiled media content in a Period.

When the G-PCC tiled media content is present, the client may identify tiles of interest in the point cloud bitstream, for example, based on the clients current viewport. The client may parse the GPCC3DRegions descriptor and/or may find the respective tiles that are within the viewport. When the 3D partitions are dynamic, the Media Segments of the timed-metadata Adaptation Set, which may carry the position and/or dimensions of a 3D region (e.g., each 3D spatial region) on the presentation timeline, may be downloaded. 3D regions that are within the viewport may be identified. The respective tiles belonging to the regions may be identified.

If tiles of interest are found, the client may select the PreSelection elements with the tiles, for example, by parsing the GPCCTileId descriptor present in a PreSelection element (e.g., each PreSelection element). The @tile_ds attribute in the GPCCTileId descriptor may list the available tiles. PreSelection elements with tiles of interest may be selected. Preselections (e.g., other Preselections) may be ignored.

When the GPCCTileId descriptor is not available, the tiles present in a PreSelection element may be identified, for example, by finding the geometry Tile Component Adaptation Set from the id list of @preselectionComponents attribute and finding the list of tile Is from the GPCCComponent descriptor present in the geometry Tile Component Adaptation Set. If the tiles of interest are present in the PreSelection element, the Preselection may be selected by the client.

From the selected Preselections, the group of Tile Component Adaptation Sets to be used for downloading Media Segments may be identified from the ID list of the @preselectionComponent attribute. In examples, the @preselectionComponents list may comprise a geometry Tile Component Adaptation Set ID. The @preselectionComponents list may comprise remaining components Tile Component Adaptation Set IDs. The ID of the Main Adaptation Set may be absent in the @preselectionComponents list. For example, the ID of the Main Adaptation Set may be identified using the @dependencyId attribute present in the Representation of the geometry Tile Component Adaptation Set.

The client may start streaming the point cloud, for example, by downloading the Initialization Segment from the Main Adaptation Set. The Initialization Segment may comprise the parameter sets for initializing the G-PCC decoder.

Initialization Segments for the coded component streams (e.g., if present) may be downloaded and/or cached in memory.

The streaming client may download time-aligned Media Segments from the geometry Tile Component Adaptation Set and/or the associated attribute Tile Component Adaptation Set. The download may be in parallel over HTTP and the downloaded segments may be stored in an in-memory segment buffer.

Time-aligned Media Segments may be removed from their respective buffers and/or concatenated with their respective Initialization Segments.

The media container (e.g., ISOBMFF) may be parsed, for example, to extract the elementary stream information. The media container may be structured and the resulting bitstream may be passed to the G-PCC decoder.

Many embodiments are described herein. Features of embodiments may be provided alone or in any combination, across various claim categories and types. Further, embodiments may include one or more of the features, devices, or aspects described herein, alone or in any combination, across various claim categories and types, such as, for example, any of the following.

A decoder, such as example decoder 300, configured to receive, decode and interpret signals (for example, as described herein) indicating elements, attributes and metadata associated with point cloud components; identify point cloud streams and their component sub-streams within a media presentation descriptor (MPD); identify versions of a point cloud and/or its components; decode an MPD to identify a main adaptation set and other adaptation sets to identify geometry-based point cloud compression (G-PCC) components in G-PCC content decode an MPD to identify the type of point cloud component in an adaptation set or a representation; decode an MPD to identify one or more preselections; decode an MPD to identify one or more versions of G-PCC media; decode an MPD to identify one or more G-PCC tile groups; decoding an MPD to identify one or more tile Is for a G-PCC component in an adaptation set; decode an MPD to identify one or more characteristics of spatial regions and mappings between the regions and G-PCC tiles, characteristics of spatial regions and mappings between the regions and corresponding adaptation sets of G-PCC components, and/or a mapping between a spatial region and corresponding adaptation sets of G-PCC components; decoding an MPD to identify a timed-metadata track for dynamic spatial regions; etc.

Decoding tools and techniques including one or more of entropy decoding, inverse quantization, inverse transformation, and differential decoding used to enable examples described herein in a decoder.

An encoder, such as example encoder 200, configured to, for example, generate, encode and send signals (for example, as described herein) indicating elements, attributes and metadata associated with point cloud components; encode an MPD to indicate point cloud streams and their component sub-streams; encode an MPD to indicate a main adaptation set and other adaptation sets to support identification of geometry-based point cloud compression (G-PCC) components in G-PCC content encode an MPD to support identification of the type of point cloud component in an adaptation set or a representation; encode an MPD to identify one or more preselections; encode an MPD to support identification of one or more versions of G-PCC media; encode an MPD to support identification of one or more G-PCC tile groups: encoding an MPD to support identification of one or more tile Is for a G-PCC component in an adaptation set; encode an MPD to support identification of one or more characteristics of spatial regions and mappings between the regions and G-PCC tiles, characteristics of spatial regions and mappings between the regions and corresponding adaptation sets of G-PCC components, and/or a mapping between a spatial region and corresponding adaptation sets of G-PCC components; decoding an MPD to identify a timed-metadata track for dynamic spatial regions; etc.

Encoding tools and techniques including one or more of quantization, entropy coding, inverse quantization, inverse transformation, and differential coding used to enable examples described herein in an encoder.

A syntax element(s) inserted in the signaling, for example, to enable the decoder to identify an indication associated with performing any of the examples described herein.

A syntax element(s) inserted in the signaling, for example, to enable an encoder to generate or encode an indication associated with performing any of the examples described herein.

A bitstream or signal may include one or more of the described syntax elements, or variations thereof associated with performing any of the examples described herein.

A method, process, apparatus, medium storing instructions, medium storing data, or signal for creating and/or transmitting and/or receiving and/or decoding a bitstream or signal that includes one or more of the described syntax elements, or variations thereof.

A method, process, apparatus, medium storing instructions, medium storing data, or signal for creating and/or transmitting and/or receiving and/or decoding according to any of the examples described herein.

A TV, set-top box, cell phone, tablet, or other electronic device that performs adaptive streaming of geometry-based point clouds, such as point cloud component substreams in point cloud streaming services, according to any of the examples described herein.

A TV, set-top box, cell phone, tablet, or other electronic device that performs adaptive streaming of geometry-based point clouds, such as point cloud component substreams in point cloud streaming services, according to any of the examples described herein, and that displays (for example, using a monitor, screen, or other type of display) a resulting image.

A TV, set-top box, cell phone, tablet, or other electronic device that selects (for example, using a tuner) a channel to receive a signal including an encoded image, and performs adaptive streaming of geometry-based point clouds, such as point cloud component substreams in point cloud streaming services, according to any of the examples described herein.

A TV, set-top box, cell phone, tablet, or other electronic device that receives (for example, using an antenna) a signal over the air that includes an encoded image, and performs adaptive streaming of geometry-based point clouds, such as point cloud component substreams in point cloud streaming services, according to any of the examples described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A device comprising:
a processor configured to:
receive, from a content server, a media presentation description (MPD) file;
determine, from the MPD file, a geometry-based point cloud compression (G-PCC) adaptation set, wherein the G-PCC adaptation set is an adaptation set associated with a G-PCC component;
determine a G-PCC tile identifier associated with a tile, wherein the G-PCC tile identifier is determined from:
a GPCCComponent descriptor associated with the G-PCC adaptation set, when the GPCCComponent descriptor is signaled at adaptation set level, and
a GPCCTileID descriptor associated with the G-PCC adaptation set, when all G-PCC components of the tile are available in one track;
request the G-PCC component using the G-PCC tile identifier associated with the tile; and
receive the G-PCC component.

2. The device of claim 1, wherein when the G-PCC tile identifier is determined from the GPCCComponent descriptor, the GPCCComponent descriptor is signaled for each point cloud component that is present in a set of representations associated with the G-PCC adaptation set.

3. The device of claim 1, wherein when the G-PCC tile identifier is determined from the GPCCComponent descriptor, the GPCCComponent descriptor comprises information associated with a geometry point cloud component present in a representation of the G-PCC adaptation set.

4. The device of claim 1, wherein when the G-PCC tile identifier is determined from the GPCCComponent descriptor, the GPCCComponent descriptor comprises: a component type, an attribute type, an attribute index, and a list of G-PCC tile identifiers, wherein the component type indicates whether the G-PCC component is a geometry component or an attribute component, wherein the attribute type indicates type of an attribute and the attribute index indicates order of the attribute present in a sequence parameter set (SPS), and wherein the attribute type and the attribute index are present in the GPCCComponent descriptor if the component type indicates a G-PCC attribute component.

5. The coding device of claim 1, wherein the processor is configured to determine a G-PCC descriptor indicating a point cloud stream present in the MPD file, wherein the G-PCC descriptor is signaled at the adaptation set level.

6. The device of claim 5, wherein the G-PCC descriptor is signaled at a preselection level using a preselection element within a period element.

7. The device of claim 1, wherein the G-PCC adaptation set comprises one or more representations.

8. The device of claim 7, wherein the one or more representations comprise at least one of bitrate, resolution, number of channels, or quality level.

9. The device of claim 1, wherein when the G-PCC tile identifier is determined from the GPCCTileID descriptor, the GPCCTileID descriptor is used for distinguishing between different G-PCC tile streams.

10. The device of claim 1, wherein when the G-PCC tile identifier is determined from the GPCCTileID descriptor, the GPCCTileID descriptor is signaled at the adaptation set level or a preselection level.

11. A method implemented by a device, the method comprising:
receiving, from a content server, a media presentation description (MPD) file;
determining, from the MPD file, a geometry-based point cloud compression (G-PCC) adaptation set, wherein the G-PCC adaptation set is an adaptation set associated with a G-PCC component;
determining a G-PCC tile identifier associated with a tile, wherein the G-PCC tile identifier is determined from:
a GPCCComponent descriptor associated with the G-PCC adaptation set, when the GPCCComponent descriptor is signaled at adaptation set level, and
a GPCCTileID descriptor associated with the G-PCC adaptation set, when all G-PCC components of the tile are available in one track;
requesting the G-PCC component using the G-PCC tile identifier associated with the tile; and
receiving the G-PCC component.

12. The method of claim 11, wherein when the G-PCC tile identifier is determined from the GPCCComponent descriptor, the GPCCComponent descriptor is signaled for each point cloud component that is present in a set of representations associated with the G-PCC adaptation set.

13. The method of claim 11, wherein when the G-PCC tile identifier is determined from the GPCCComponent descriptor, the GPCCComponent descriptor comprises information associated with a geometry point cloud component present in a representation of the G-PCC adaptation set.

14. The method of claim 11, further comprising determining a G-PCC descriptor indicating a point cloud stream present in the MPD file, wherein the G-PCC descriptor is signaled at the adaptation set level.

15. The method of claim 14, wherein the G-PCC descriptor is signaled at a preselection level using a preselection element within a period element.

16. The method of claim 11, wherein the G-PCC adaptation set comprises one or more representations.

17. The method of claim 16, wherein the one or more representations comprise at least one of bitrate, resolution, number of channels, or quality level.

18. The method of claim 11, wherein when the G-PCC tile identifier is determined from the GPCCTileID descriptor, the GPCCTileID descriptor is used for distinguishing between different G-PCC tile streams.

19. The method of claim 11, wherein when the G-PCC tile identifier is determined from the GPCCTileID descriptor, the GPCCTileID descriptor is signaled at the adaptation set level or a preselection level.

20. The method of claim 11, wherein when the G-PCC tile identifier is determined from the GPCCComponent descriptor, the GPCCComponent descriptor comprises: a component type, an attribute type, an attribute index, and a list of G-PCC tile identifiers, wherein the component type indicates whether the G-PCC component is a geometry component or an attribute component, wherein the attribute type indicates type of an attribute and the attribute index indicates order of the attribute present in a sequence parameter set (SPS), and wherein the attribute type and the attribute index are present in the GPCCComponent descriptor if the component type indicates a G-PCC attribute component.

* * * * *